(12) United States Patent  
McBeath

(10) Patent No.: US 11,704,282 B2
(45) Date of Patent: Jul. 18, 2023

(54) NOTIFICATIONS AND GRAPHICAL USER INTERFACE FOR APPLICATIONS IN FOLDERS

(71) Applicant: BlackBerry Limited, Waterloo (CA)

(72) Inventor: Sean Michael McBeath, Keller, TX (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/221,095

(22) Filed: Dec. 14, 2018

(65) Prior Publication Data

US 2020/0192868 A1     Jun. 18, 2020

(51) Int. Cl.
*G06F 16/16*     (2019.01)
*G06F 9/54*     (2006.01)

(52) U.S. Cl.
CPC ............ *G06F 16/168* (2019.01); *G06F 9/542* (2013.01)

(58) Field of Classification Search
CPC .... G06F 3/04812; G06F 16/168; G06F 9/542; G06F 3/04842; G06F 3/04883; G06F 3/0481; H04N 1/00424
See application file for complete search history.

(56) References Cited

U.S. PATENT DOCUMENTS

| 2002/0046299 A1* | 4/2002 | Lefeber .................. H04L 67/26 719/318 |
| 2010/0011304 A1 | 1/2010 | Van Os |
| 2011/0252346 A1 | 10/2011 | Chaudhri |
| 2012/0052918 A1* | 3/2012 | Yang ................... G06F 3/04817 455/566 |
| 2012/0204191 A1 | 8/2012 | Shia et al. |
| 2013/0007665 A1* | 1/2013 | Chaudhri ............ G06F 3/04842 715/830 |
| 2013/0024794 A1* | 1/2013 | Ha ......................... G06F 3/0485 715/765 |
| 2014/0096064 A1* | 4/2014 | Suzuki .................. G06F 3/1208 715/778 |

(Continued)

FOREIGN PATENT DOCUMENTS

| EP | 2426898 A2 | 3/2012 |
| EP | 2426898 A3 | 3/2015 |
| EP | 3477456 A1 | 5/2019 |
| WO | 2018016741 A1 | 1/2018 |

OTHER PUBLICATIONS

"How to Change an App's Badge Icon Setting on an iPad", pp. 1-10 (Year: 2016).*

(Continued)

*Primary Examiner* — Jennifer N Welch
*Assistant Examiner* — Kc Chen
(74) *Attorney, Agent, or Firm* — Conley Rose, P.C.; J. Robert Brown, Jr.

(57) ABSTRACT

A method at an electronic device having a display, the method including displaying a user interface on the display, wherein the user interface includes at least one folder icon for a folder, the folder including at least two applications; determining that at least two applications in the folder have at least one notification and at least one application in the folder has more than one notification; and appending, to the folder icon, a badge having a number, wherein the number represents a number of applications in the folder having notifications.

18 Claims, 24 Drawing Sheets

(56) References Cited

U.S. PATENT DOCUMENTS

| | | | |
|---|---|---|---|
| 2015/0180746 A1* | 6/2015 | Day, II | H04L 51/16 |
| | | | 455/405 |
| 2015/0334118 A1 | 11/2015 | Tuan et al. | |
| 2016/0050307 A1 | 2/2016 | Yan et al. | |
| 2016/0164986 A1* | 6/2016 | Chen | G06F 3/0488 |
| | | | 715/753 |
| 2016/0259413 A1* | 9/2016 | Anzures | G06F 3/0482 |
| 2016/0259489 A1* | 9/2016 | Yang | G06F 3/0481 |
| 2016/0299679 A1 | 10/2016 | Park et al. | |
| 2017/0046025 A1* | 2/2017 | Dascola | G06F 3/0482 |
| 2017/0075520 A1 | 3/2017 | Bauer et al. | |
| 2017/0083208 A1* | 3/2017 | Hyun | G06F 3/0488 |
| 2017/0185753 A1* | 6/2017 | Yang | G06F 21/10 |
| 2018/0004367 A1* | 1/2018 | Sento | G06F 3/0482 |
| 2018/0284970 A1* | 10/2018 | Sudo | G06F 3/04817 |
| 2018/0356954 A1 | 12/2018 | Hyun et al. | |
| 2019/0058771 A1 | 2/2019 | Yalamanchili | |
| 2019/0114472 A1* | 4/2019 | Hodge | H04N 7/181 |
| 2019/0146643 A1 | 5/2019 | Foss et al. | |

OTHER PUBLICATIONS

Screenshots of ipad pp. 1-4 (Year: 2016).*

McBeath, Sean Michael; U.S. Appl. No. 16/221,084, filed Dec. 14, 2018; Title: Notifications and Graphical User Interface for Applications in Folders; 66 pages.

Apple, Inc.; "How to Move Apps and Create Folders on Your iPhone, iPad, or iPod Touch"; https://support.apple.com/en-us/HT200290; Sep. 17, 2018; 3 pages.

Apple, Inc.; "Human Interface Guidelines—Notifications"; https://developer.apple.com/design/human-interface-guidelines/ios/system-capabilities/notifications/; Jun. 13, 2016; 3 pages.

Final Office Action dated Apr. 9, 2020; U.S. Appl. No. 16/221,084, filed Dec. 14, 2018; 28 pages.

European Extended Search Report; Application No. 19213905.3, dated Apr. 14, 2020; 7 pages.

Office Action dated Dec. 23, 2019; U.S. Appl. No. 16/221,084, filed Dec. 14, 2018; 26 pages.

Advisory Action dated Jul. 14, 2020; U.S. Appl. No. 16/221,084, filed Dec. 14, 2018; 14 pages.

Office Action dated Oct. 5, 2020; U.S. Appl. No. 16/221,084, filed Dec. 14, 2018; 24 pages.

Notice of Allowance dated Jun. 25, 2021; U.S. Appl. No. 16/221,084, filed Dec. 14, 2018; 15 pages.

European Extended Search Report; Application No. 19213924.4, dated Apr. 9, 2020; 7 pages.

Final Office Action dated Apr. 1, 2021; U.S. Appl. No. 16/221,084, filed Dec. 14, 2018; 31 pages.

European Examination Report; Application No. 19213905.3, dated Jan. 28, 2022; 6 pages.

European Examination Report; Application No. 19213924.4, dated Dec. 3, 2021; 6 pages.

* cited by examiner

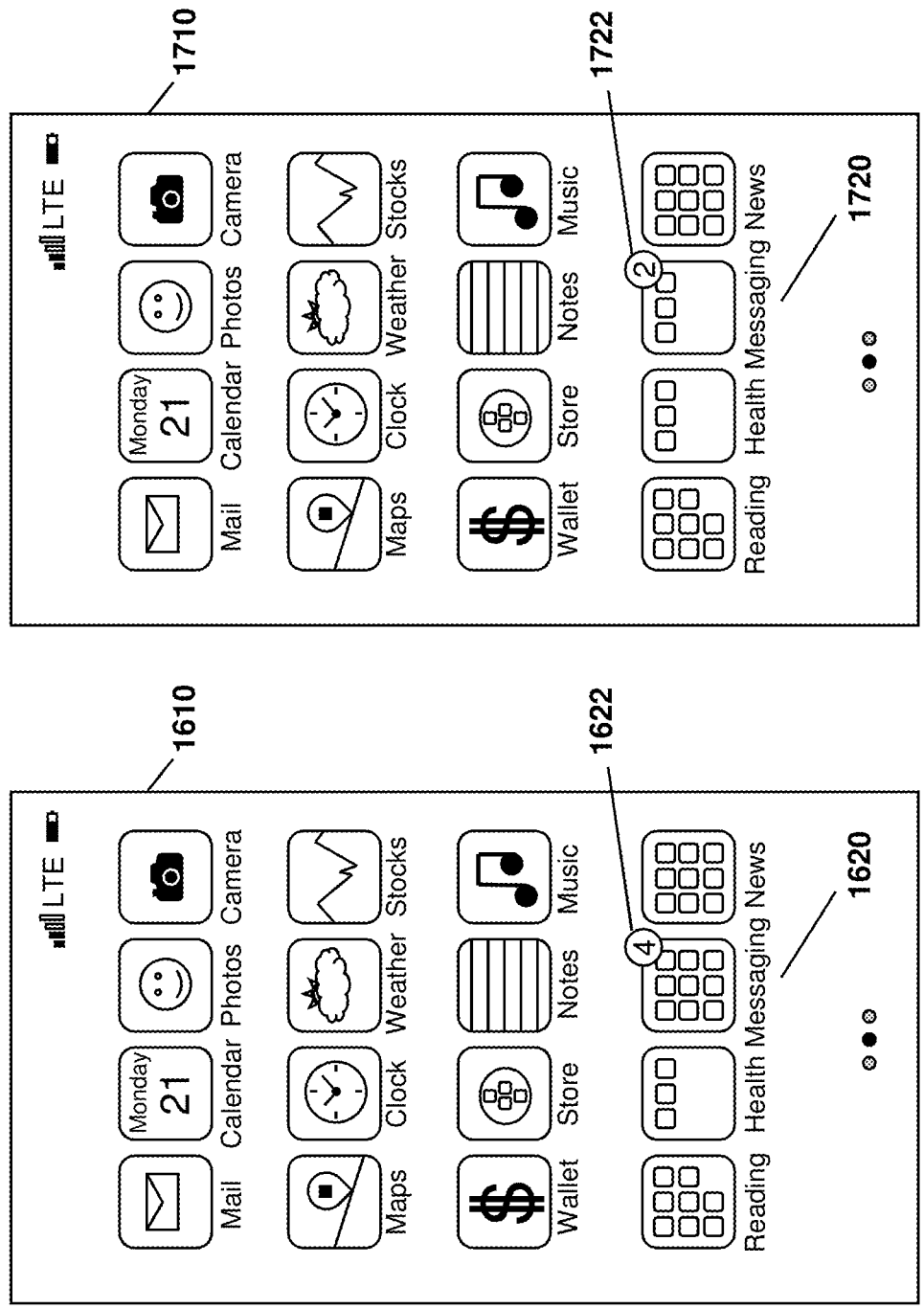

NOTIFICATIONS AND GRAPHICAL USER INTERFACE FOR APPLICATIONS IN FOLDERS

FIELD OF THE DISCLOSURE

The present disclosure relates to folders on a graphical user interface, and in particular relates to badging for folders on a graphical user interface.

BACKGROUND

Application notifications, including icon badging, are used to provide users with information about the application. For example, in various operating systems, application icon badges may be provided in an upper right corner of the icon and represent critical information about the application. In some cases, the icon badge may represent a number of unread messages or notifications in the application.

Further, folders are used to organize applications into common areas for ease of access. Such folders may include icon badging, which may represent the number of unread messages for the applications found within the folder.

Unfortunately, application notifications and folders are not well optimized and can potentially confuse or overwhelm a user.

BRIEF DESCRIPTION OF THE DRAWINGS

The present disclosure will be better understood with reference to the drawings, in which:

FIGS. 16 and 17 are block diagrams showing a user interface in which a view of a folder and badging total may alternate between screens based on a number of applications within the folder;

DETAILED DESCRIPTION OF THE DRAWINGS

Figure 2:
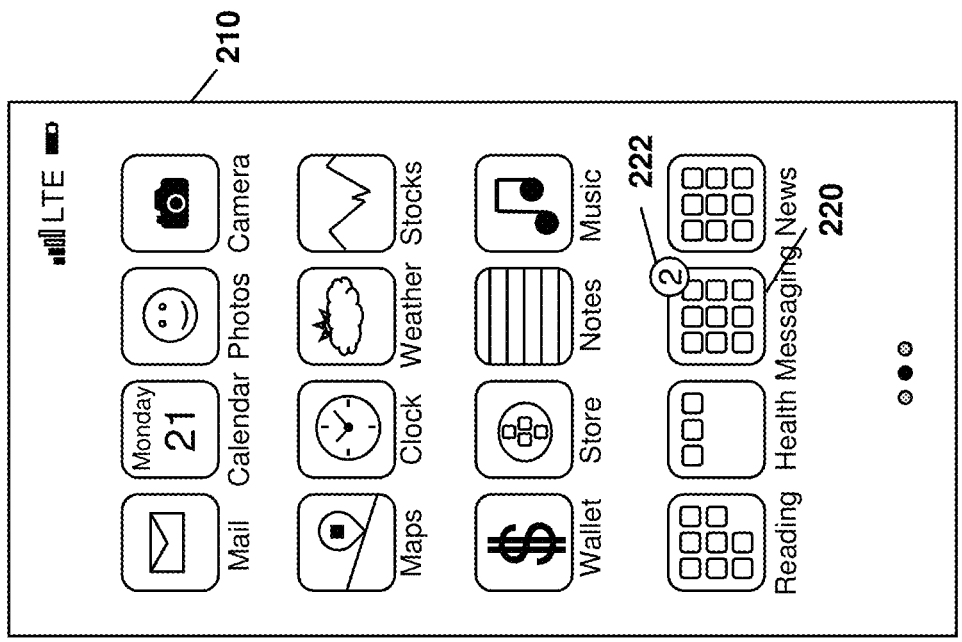
FIG. 2 is a block diagram showing an example user interface in which a folder icon includes a badge.

The present disclosure provides a method at an electronic device having a display, the method comprising: displaying a user interface on the display, wherein the user interface includes at least one folder icon for a folder, the folder including at least two applications; determining that at least two applications in the folder have at least one notification and at least one application in the folder has more than one notification; and appending, to the folder icon, a badge having a number, wherein the number represents a number of applications in the folder having notifications.

The present disclosure further provides an electronic device, the electronic device comprising: a processor; and a display, wherein the electronic device is configured to: display a user interface on the display, wherein the user interface includes at least one folder icon for a folder, the folder including at least two applications; determine that at least two applications in the folder have at least one notification and at least one application in the folder has more than one notification; and append, to the folder icon, a badge having a number, wherein the number represents a number of applications in the folder having notifications.

The present disclosure further provides a computer readable medium for storing instruction code, which, when executed by a processor of an electronic device having a display, cause the electronic device to: display a user interface on the display, wherein the user interface includes at least one folder icon for a folder, the folder including at least two applications; determine that at least two applications in the folder have at least one notification and at least one application in the folder has more than one notification; and append, to the folder icon, a badge having a number, wherein the number represents a number of applications in the folder having notifications.

Modern electronic devices support the provision of notifications using the icons for the application. For example, a mail application may include a "badge" that may be affixed to the icon for the mail application to indicate unread messages. In some cases, the badge will include a number to indicate the number of unread messages. In other cases, the badge will simply provide an indication that one or more unread messages exist within that application.

For example, in the Apple™ iOS, badges include a number of unread messages or unseen notifications for that application. For example, Apple states, in documentation on application badging:

Use badging to supplement notifications, not to denote critical information. Keep in mind that badging of your app can be turned off. If your app relies on badging to communicate important information, you run the risk of people missing it.

Use badging for notification purposes only. Badges shouldn't be used to display other types of numeric information, such as air quality, dates, stock prices, or weather.

Keep badges up to date. Update your app's badges as soon as the corresponding information is read. You don't want people to think there's new information available, only to find that they've already seen it. Note that reducing a badge's count to zero removes all related notifications from Notification Center.

Figure 1:
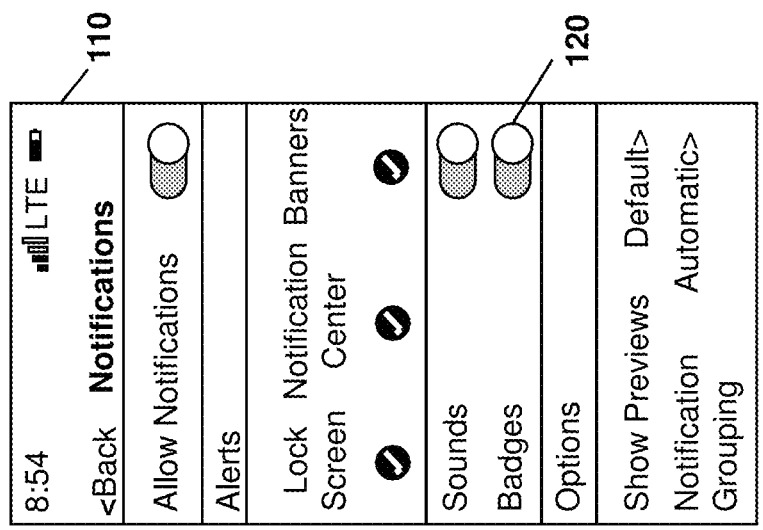
FIG. 1 is a block diagram of an example user interface showing an option to activate or deactivate badges on application icons.

In most operating systems, badges are optional and may be turned off. Thus, for example, reference is made to FIG. 1, which shows a configuration screen for notifications for an application. In the example of FIG. 1, configuration screen 110 includes a toggle bar 120 that will allow badges to be turned on or off for that application.

Further, various operating systems, including but not limited to iOS and Android, allow applications to be placed within folders. This is typically done by dragging the icons of existing applications to existing folders, or by grouping applications to create a folder.

The current solution for application icon badging when multiple applications are located within a single folder is to simply sum the values of individual badges for the applications within the folder and to provide a corresponding badge at the folder level.

For example, referring to FIG. 2, a graphical user interface 210 includes a plurality of icons. Icon 220 represents a folder labelled "messaging" which has a plurality of applications stored therein. In the example of FIG. 2, the messaging folder includes a badge 222 showing that two messages or notifications are unread within the folder. Specifically, if the messaging folder was opened, one or more icons in the folder would include badges whose sum would add to two. This is, for example, shown in FIGS. 3 and 4, which show that the messaging folder on graphical user interfaces 310 and 410 includes 12 applications. Applications 320 and 322 both have a single unread message or notification, shown with badges 330 and 332. Therefore, in this case, the folder badge 222 includes a sum of badges 330 and 332.

However, by merely showing a sum of notifications within a folder, the user experience may be sub-optimal. In particular, in some cases, applications that the user cares less about may provide notifications that may distract the user. In other cases, a badge on the folder itself may be distracting. In other cases, applications may overwhelm a user with a number of notifications. In this regard, various solutions are provided below to enhance a user experience with a graphical user interface. The solutions presented below may be implemented individually or may be combined in various configurations and the present disclosure is not limited to any particular combination of the solutions below.

Badging Represents a Number of Applications with Notifications

In accordance with one embodiment of the present disclosure, a folder badge is a count of applications within a folder that include a badge, irrespective of the number on that badge.

Figure 5:
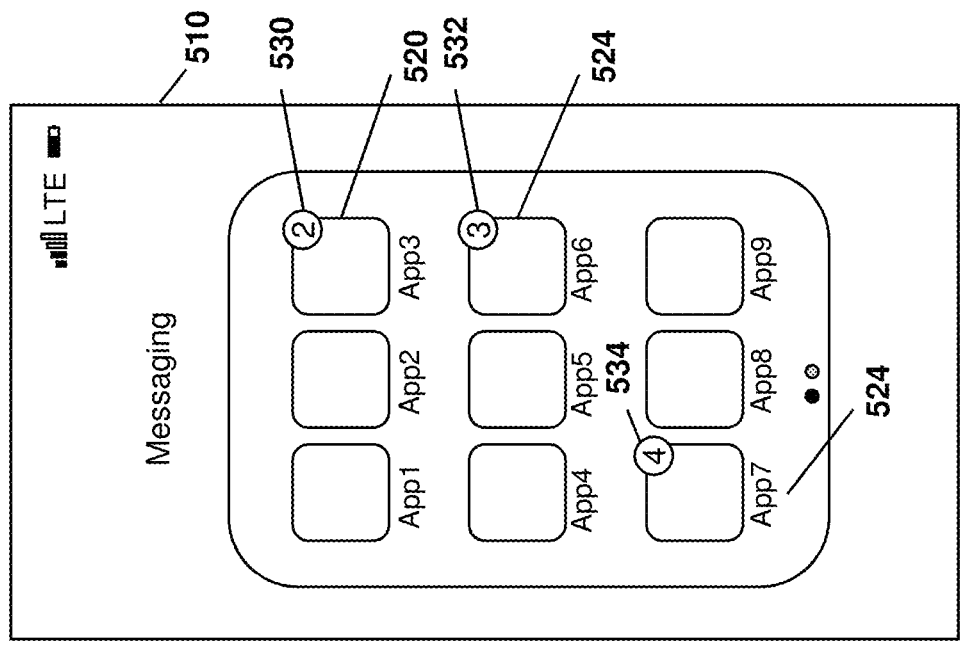
FIG. 5 is a block diagram of a user interface showing a folder with application icons having badges thereon.

For example, reference is now made to FIG. 5. In the embodiment of FIG. 5, a graphical user interface 510 shows an expanded view of a messaging folder. In the embodiment of FIG. 5, application icons 520, 522 and 524 all include a badge. Specifically, application icon 520 includes a badge 530. The application icon 522 includes a badge 532. Application icon 524 includes a badge 534.

In the example of FIG. 5, badge 530 includes a value of "2". Badge 532 includes a value of "3". Badge 534 includes a value of "4". Thus, the sum of the badges within the folder is "9". Under a traditional system, if the folder was closed then the value of the badge on that folder would show nine messages or notifications that are unread.

However, in accordance with the present embodiment, the value of the badge merely indicates how many applications have notifications. Thus, referring to FIG. 6, a graphical user interface 610 includes the folder 620 for the messaging, which has been closed. In this case, the badge 622 includes a value of "3", indicating the number of applications within the folder that have badges.

Figure 6:
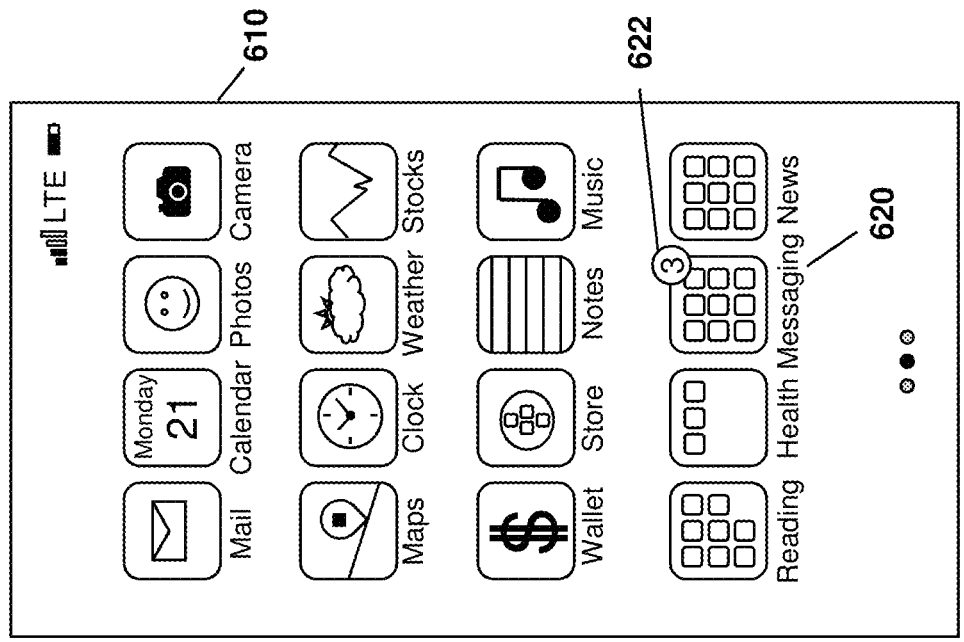
FIG. 6 is a block diagram of the user interface showing a folder in which the badge reflects the number of applications in the folder having a notification.

The embodiment of FIG. 5 or 6 has the potential to lessen user anxiety by showing only the number of applications that require attention rather than the total number of messages that require attention.

In some cases, the option for the type of the badging display may be configured by a user. For example, a user may invoke a configuration interface by tapping on the badge or "long pressing" on a folder, among other options. The user may then be able to toggle between showing the total number of notifications or the number of applications that include notifications. Thus, in the examples of FIGS. 5 and 6, badge 622 could be configured to either show "9" or "3", depending on the configuration set by the user.

Figure 7:
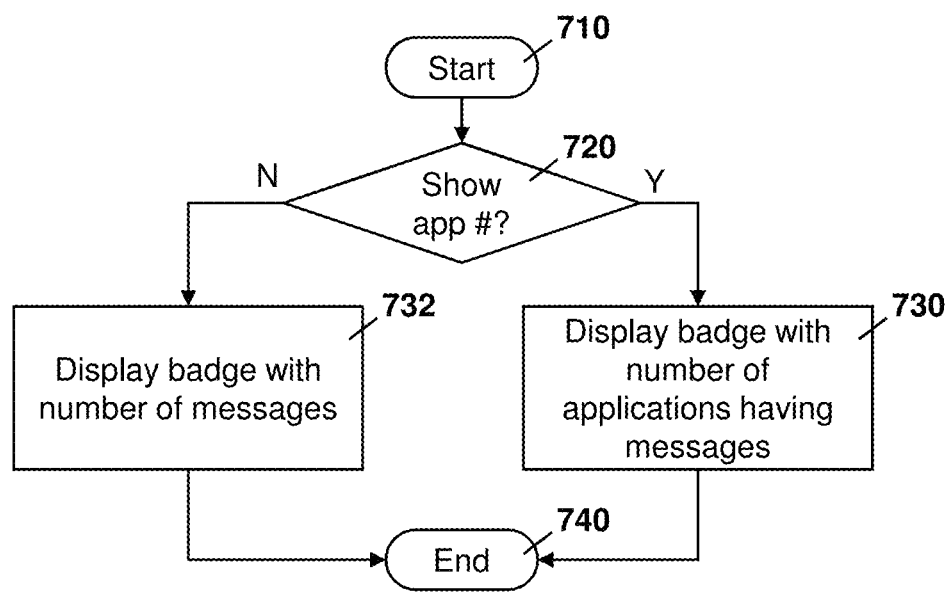
FIG. 7 is a process diagram showing the determination of a badge number for a folder icon.

For example, reference is now made to FIG. 7, which is a process for showing the badge number. In particular, the process of FIG. 7 starts at block 710 and proceeds to block 720 in which a check is made to determine whether to show the number of applications with notifications as part of the badge. The check at block 720 may, for example, verify configuration parameters set by a user.

From block 720, if the badge is configured to show the number of applications with notifications, the process proceeds to block 730 in which the badge is displayed with that the number of applications having messages or notifications. In this case, the badge would show a "3", for the embodiments of FIGS. 5 and 6.

Conversely, from block 720, if the configuration is not set to show the number of applications with notifications, then the process may default to showing the total number of notifications within that folder and sum the values of the badges within that folder. This is shown at block 732. In this case, the badge would show a "9" for the embodiment of FIG. 5.

From block 730 or from block 732, the process proceeds to block 740 and ends.

Opening Applications Directly

In a further embodiment of the present disclosure, if there is only one application that has a badge within a folder, and the user clicks on the folder, then the computing device may directly launch the application with the badge.

Figure 8:
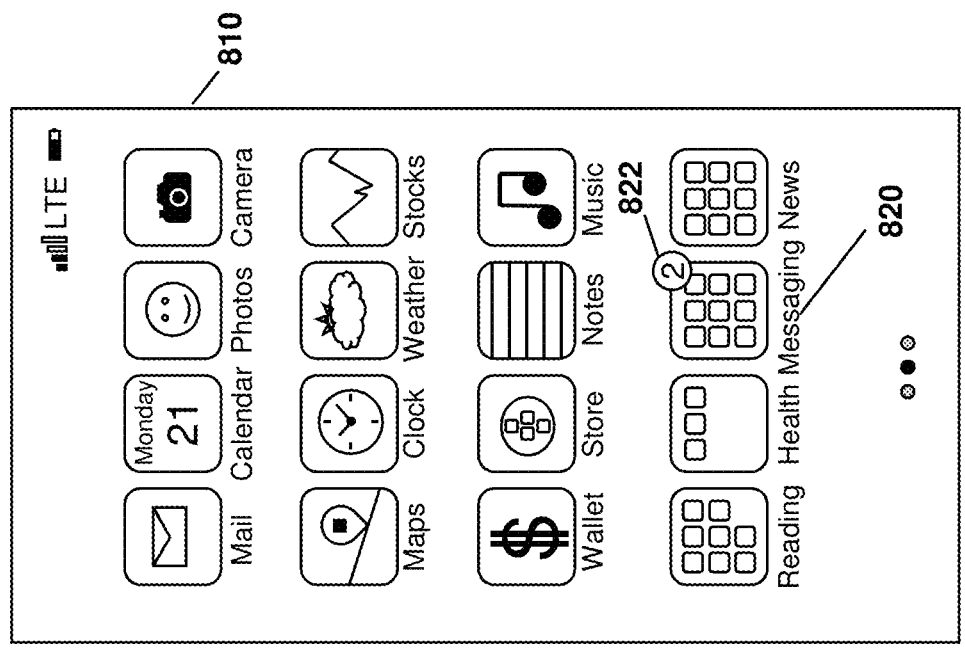
FIG. 8 is a block diagram of a user interface in which a folder has one application with notifications therein.

For example, reference is now made to FIG. 8. As seen in FIG. 8, a graphical user interface 810 includes a folder icon 820 with a badge 820 to show that there are two notifications within the folder.

Figure 9:
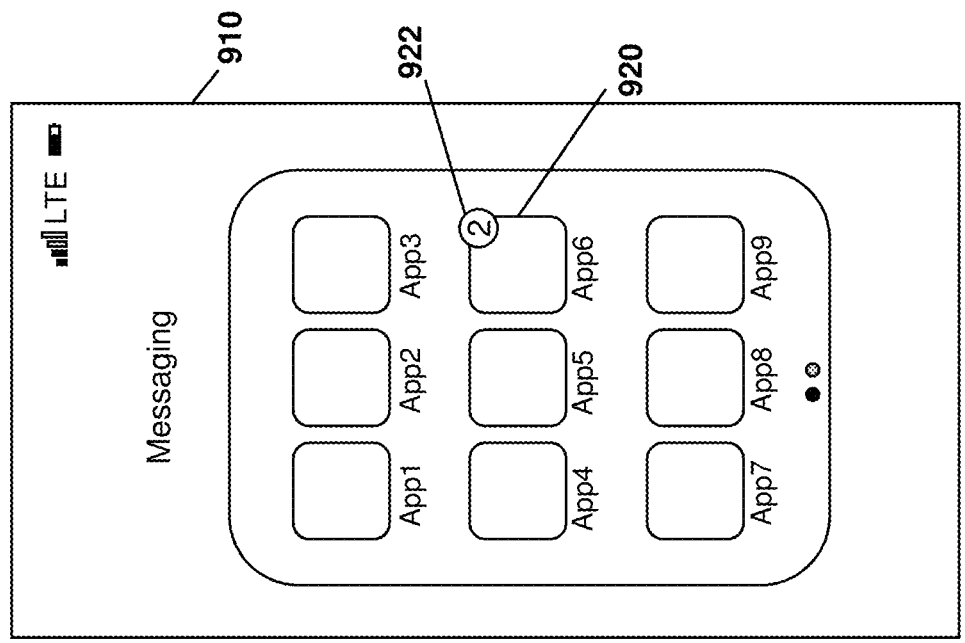
FIG. 9 is a block diagram of the user interface of the folder from FIG. 8 to show the application with a notification badge.

Typically, if a user clicked on the folder icon 820, then the graphical user interface 910 of FIG. 9 would be displayed. In particular, the messaging folder would show an application icon 920 having a badge 922 thereon.

However, in the examples of FIGS. 8 and 9, only one application has a badge. Therefore, in accordance with the present embodiment, instead of opening the graphical user interface 910 of FIG. 9, the application associated with icon 920 may be directly opened.

Figure 10:
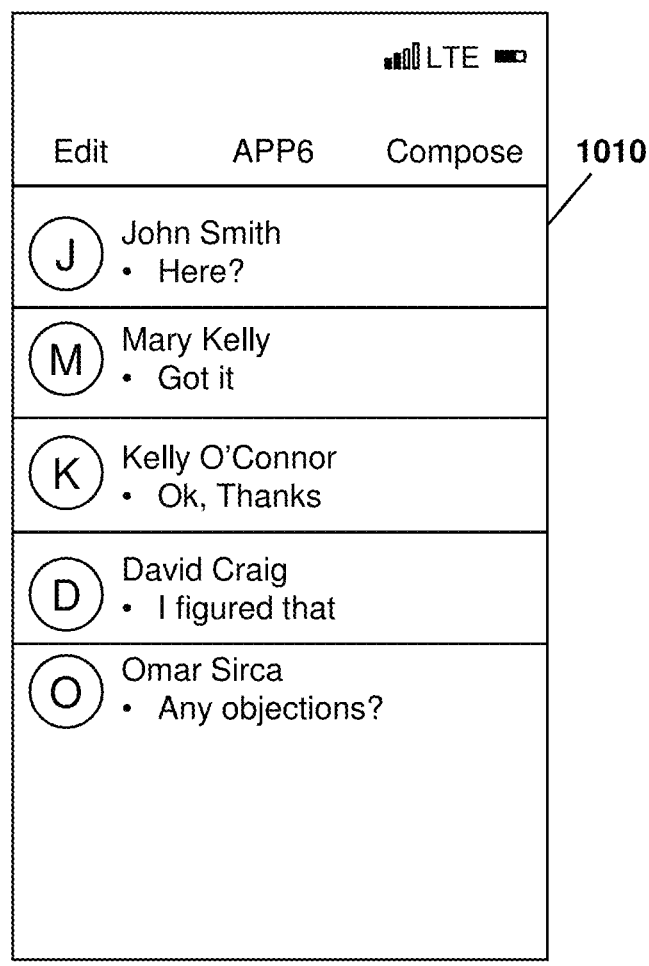
FIG. 10 is a block diagram of a user interface showing an application user interface that may be directly launched from a folder icon.

For example, reference is now made to FIG. 10. FIG. 10 shows the graphical user interface 1010 of the application associated with application icon 920. Therefore, when a user clicks on folder icon 820, the graphical user interface 1010 is opened directly since only one application within the folder had a badge.

Conversely, if the folder associated with icon 820 has multiple applications with badges, then the user interface 910 of FIG. 9 would open on icon 820 being selected.

Figure 11:
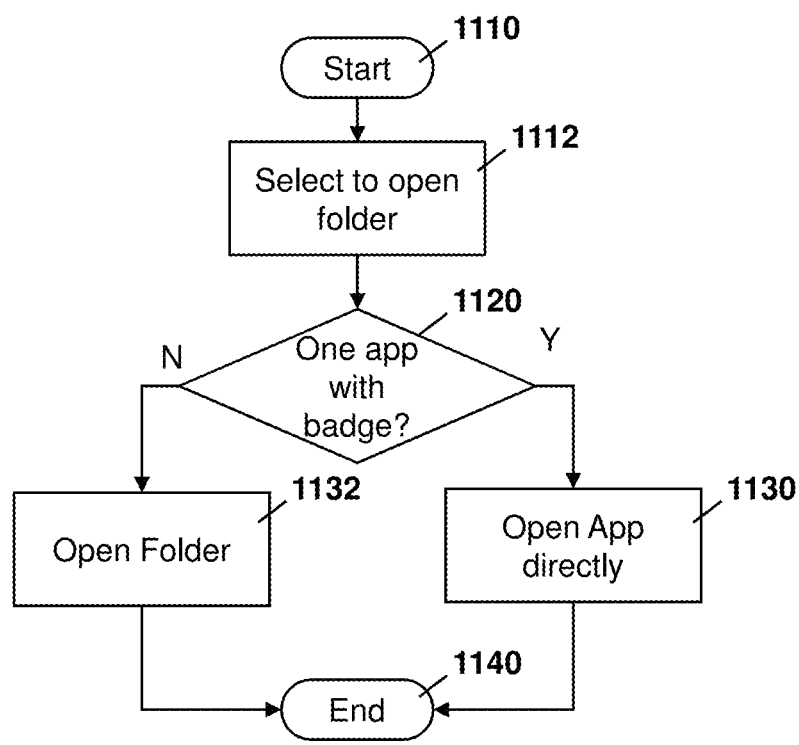
FIG. 11 is a process diagram showing determination of whether to expand the folder or launch an application directly.

The above is illustrated with regard to FIG. 11. In particular, the process of FIG. 11 starts at block 1110 and proceeds to block 1112 in which a folder is selected to be opened. The selection of the folder to be opened can, for example, involve a user clicking on the folder on a graphical user interface, either through a touchscreen or through a pointing device, among other options.

Once the folder is selected to be opened, the process proceeds to block 1120 in which a check is made to determine whether there is only one application within the folder that has a badge. If yes, the process proceeds to block 1130 in which the application within the folder with the badge is opened directly.

Conversely, if more than one application within the folder has a badge, or if no applications within the folder have a badge, then the process proceeds to block 1132 in which the folder is opened. This is, for example, illustrated by FIG. 9.

From block 1130 or 1132 the process proceeds to block 1140 and ends.

The embodiments of FIGS. 8 to 11 therefore provide a way to access an application that has a message or notifications more quickly, by removing the intermediate step of the folder being opened and requiring a user to select a particular application.

The opening of an application with a notification or message directly from the folder level may be configured. For example, the choice of whether to launch applications directly on folder selection may be part of the folder configuration menu. Other options are possible for the configuration of such action.

Configuring which Applications Affect Folder Badging

In a further embodiment of the present disclosure, for each application within a folder, the user can configure whether the application badging within the folder impacts the badge on the folder itself. In this way, some applications can cause the folder badge to appear or change, while other applications cannot.

Figure 12:
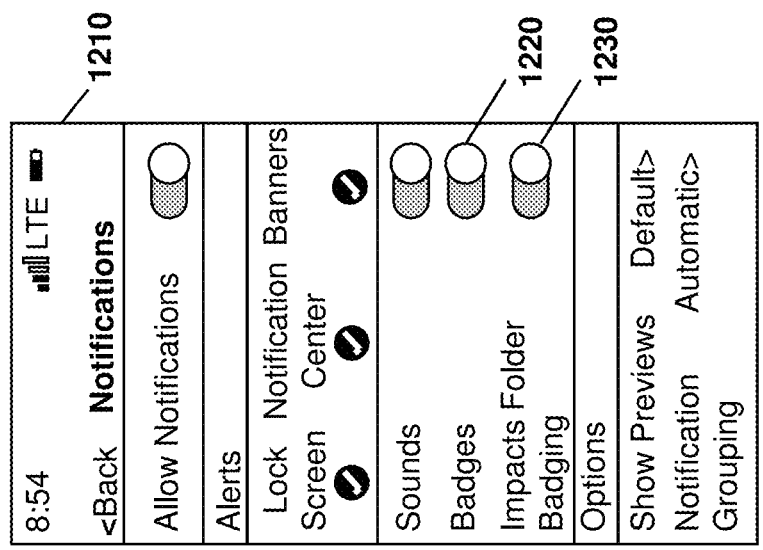
FIG. 12 is a block diagram showing a user interface for configuring whether badges on applications have impacts on a folder in which the application icon resides.

A first aspect of this embodiment is to have the option in the application notifications configuration on whether the application impacts folder badging. In particular, reference is now made to FIG. 12. In the embodiment of FIG. 12, a graphical user interface 1210 shows a configuration menu for an application. The configuration menu is for notifications in this case, and includes a toggle 1220 which shows whether or not badges will be displayed for the application.

Further, in the embodiment of FIG. 12, a toggle 1230 is provided which indicates whether the application will impact folder badging.

The ability to select whether the application badging affects the folder badging provides for several benefits. In particular, a user may not be as interested in notifications from one application, but may be more interested in notifications from other applications within a folder. In this regard, the user may not want to see the notifications at the folder level. However, when the folder is opened, the badging still exists and therefore allows for the user to quickly be able to determine the number of notifications or messages for the particular application.

The reduction in the folder badging may also lower a user's anxiety. For example, if the user sees many messages within a folder, this may cause the user's anxiety levels to increase. However, in some cases the notifications may be for applications that are not relevant or important to the user, and therefore, by reducing the folder badging number, this may reduce the anxiety for the user.

Other benefits would be evident to those skilled in the art having regard to the present disclosure.

Figure 13:
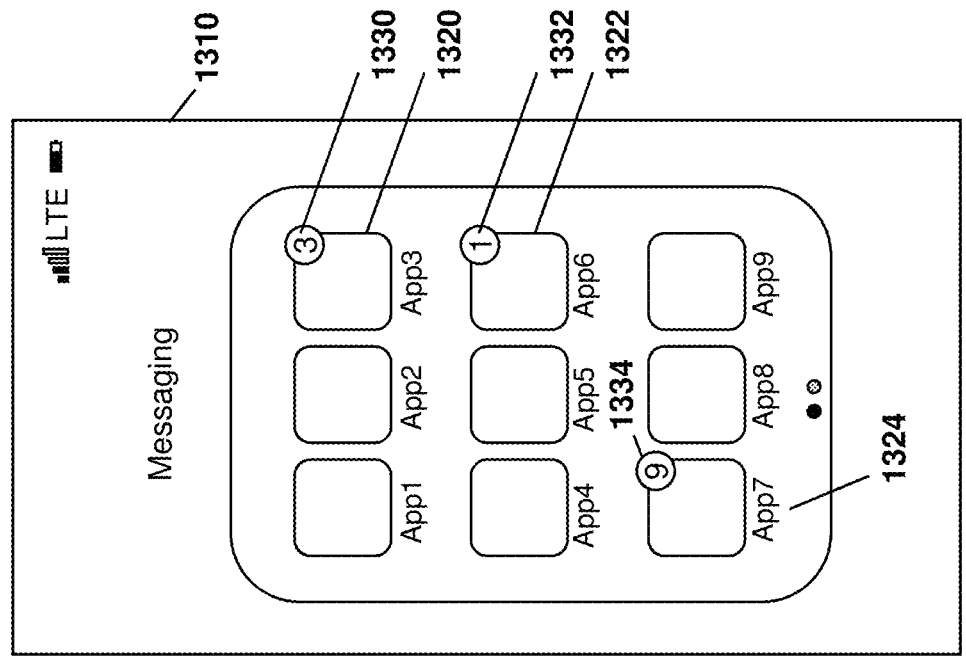
FIG. 13 shows a block diagram of a user interface showing an expanded folder in which to applications have badges that impact folder badging while a third application does not impact folder badging.

Reference is now made to FIG. 13. In the embodiment of FIG. 13, the messaging folder on graphical user interface 1310 has been opened and application icons 1320, 1322 and 1324 for all have badging. In particular, application icon 1320 has a badge 1330. Application icon 1322 has badge 1332. Application icon 1324 has badge 1334.

A user may not be as interested in the notifications from an application associated with icon 1324. In this regard, the user may open the notifications menu for the application and toggle the "impacts folder badging" toggle switch to an off position.

Figure 14:
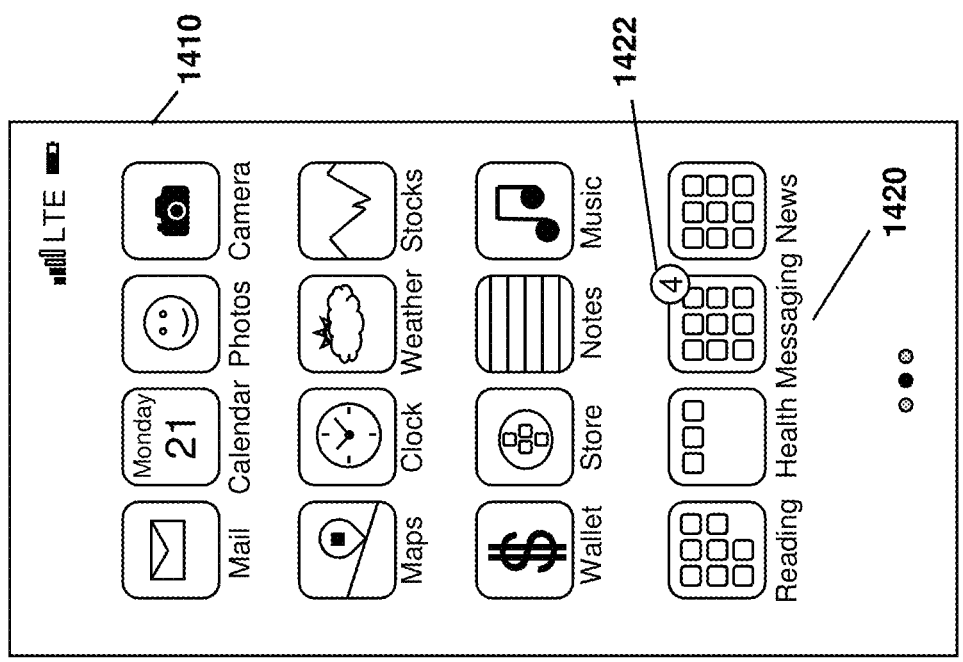
FIG. 14 shows a block diagram of the user interface in which the folder of FIG. 13 has been closed and the badging associated with the folder reflects only the applications that impact such badging.

Thereafter, once the user closes the messaging folder, only badges 1330 and 1332 are counted towards the folder badge total. This is for example illustrated in FIG. 14, which shows graphical user interface 1410. The messaging folder 1420 includes a badge 1422 with a badge total reflecting the applications whose notification total should be added to the folder total, but excluding applications where the badge total should not be included in the folder badge total. In this case, badge totals from badges 1330 and 1332 are included, but badge totals from badge 1334 are excluded.

Figure 15:
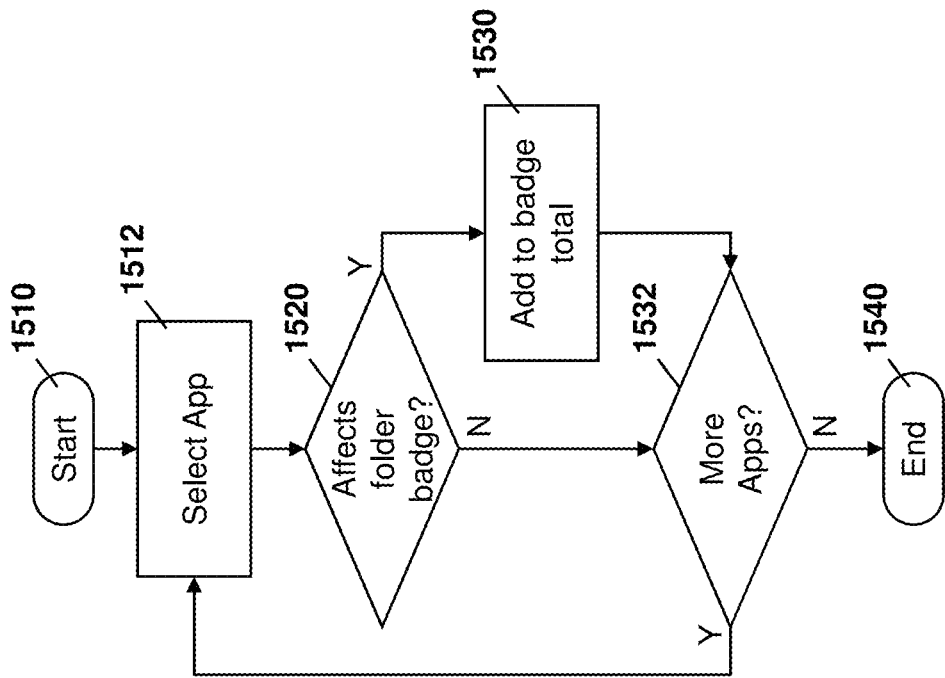
FIG. 15 is a process diagram showing a process for determining whether to add a notification total from applications to folder badging.

The creation of the folder badge total could be done, for example, in accordance with the process of FIG. 15. In the embodiment of FIG. 15, the process starts at block 1510 and proceeds to block 1512 in which an application within the folder is selected. The process then proceeds to block 1520 in which a check is made to determine whether the application should affect the folder badge. If yes, then the process proceeds to block 1530 in which the application badge number is added to the folder badge total.

From block 1520, if the application does not affect the folder badge total, or from block 1530, the process proceeds to block 1532 in which check is made to determine whether more applications are within the folder. If there are more applications, then the process may proceed back to block 1512 in which a new application is selected and the process continues until all the applications in the folder are considered.

Once all of applications within the folder are considered, the process proceeds from block 1532 to block 1540 and ends. At this point, the folder badge total reflects the applications that a user has selected or allowed to show within the folder badge total.

Toggling a Folder Icon and Badge

In accordance with a further embodiment of the present disclosure, a device may cycle through various folder panes when the user picks up the device. In this embodiment a folder level badge may be updated based on the folder pane being displayed. Once the device cycles through each pane, the device may return to the first pane and in some cases may then discontinue cycling.

Figure 4:
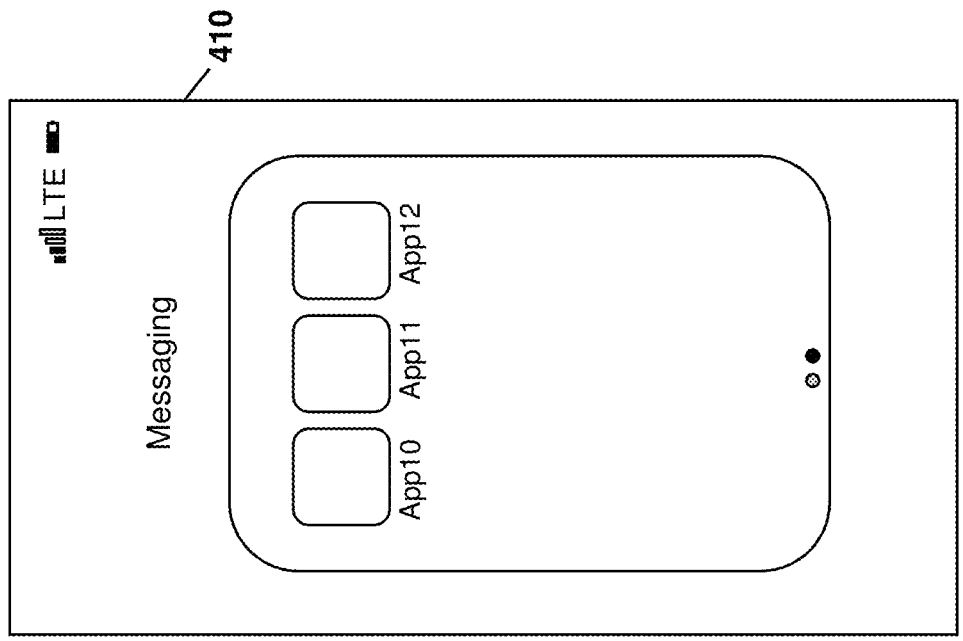
FIG. 4 is a block diagram of a user interface showing a second screen of application icons from that of FIG. 3.
Figure 3:
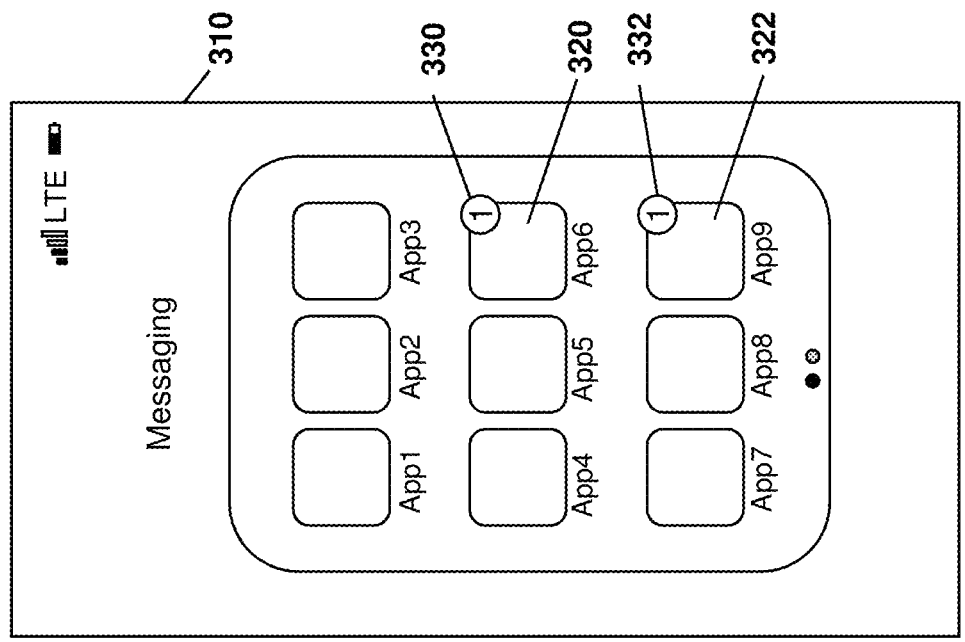
FIG. 3 is a block diagram of a user interface in which a folder has been expanded to show application icons with badges.

For example, as illustrated in FIGS. 3 and 4 above, a messaging folder may include 12 applications, which may not fit onto one folder screen. Therefore, as seen in the embodiment of FIG. 4, a second screen for the messaging applications is provided.

In this case, when a user first interacts with the computing device, for example after the device has been the sleep state, the graphical user interface 1610 of FIG. 16 may be presented to the user. In this case, the messaging folder 1620 has a badge 1622 showing that there are of 4 notifications for the first screen within the messaging folder.

After a predetermined length of time, for example one second, the graphical user interface 1710 of FIG. 17 may be displayed to a user. In this case, messaging folder 1720 includes a badge 1722 showing thumbnails and a badge total for the second screen of the messaging folder.

After a set length of time, in some cases the process may again show graphical user interface 1610 of FIG. 16.

In some cases, the display could toggle between graphical user interface 1610 and a graphical user interface 1710 at a set time period. For example, the graphical display could change every second. However, other time lengths are possible.

In other cases, after graphically user interface 1710 has been shown, the process may proceed to show only graphical user interface 1610 thereafter. The process would then next toggle between the screens when the user has put down the device and then picked up the device again.

In other cases, the toggling between graphical user interfaces 1610 and 1710 may occur periodically. For example, this may occur every five minutes.

Other options for toggling between the screens are possible

Figure 18:
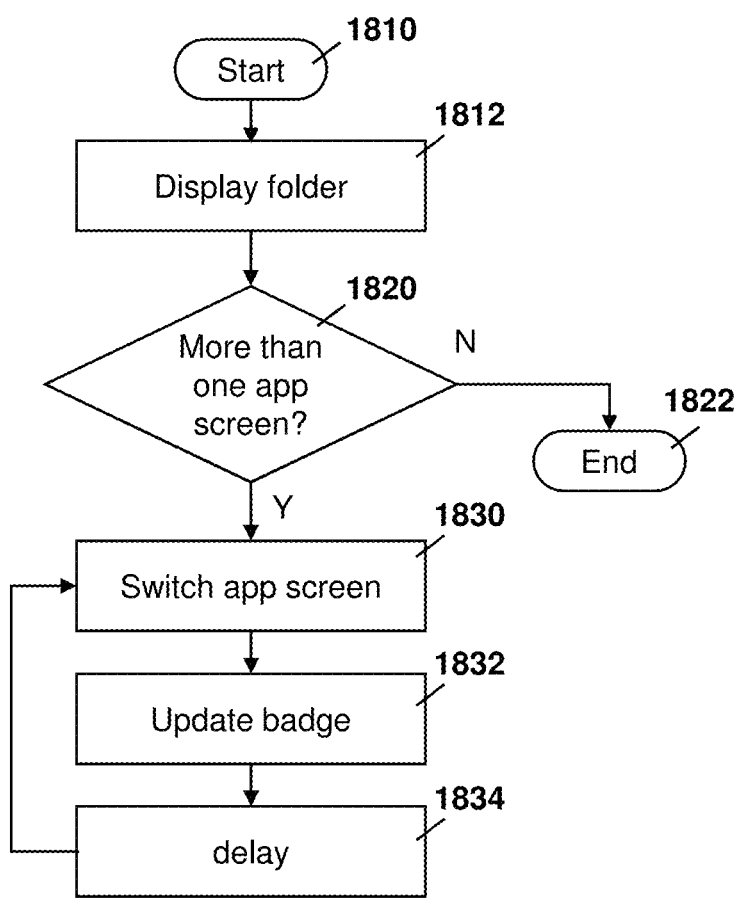
FIG. 18 is a process diagram showing the switching between folder views for the process shown by FIGS. 16 and 17.

Reference is now made to FIG. 18. The process of FIG. 18 starts at block 1810 and proceeds to block 1812 in which a folder is displayed. In this case, the folder may be folder 1620 or 1720.

The process then proceeds to block 1820 in which a check is made to determine whether the folder has more than one screen of applications. If not, the process proceeds to block 1822 and ends.

If there is more than one screen of applications for the folder, then the process may proceed to block 1830 in which the folder screen is switched. The process then proceeds to block 1832 in which the badge for the folder is updated to reflect the thumbnails for the folder. The process then proceeds to block 1834 in which a delay is introduced.

From block 1834 the process may proceed to block 1830 in which the screen is switched again and may continue in this way. In other cases, if the second or third screens are only to be shown once, then the process may proceed to block 1822 after all of the screens have been shown and end.

Configuring Folder Badges Independent of Application Badges

In a further embodiment, a user may and may be presented with configuration options for the folder. One of the configuration options allows the user to enable or disable badging of the folder itself, independent of badging of the applications within the folder.

Figure 19:
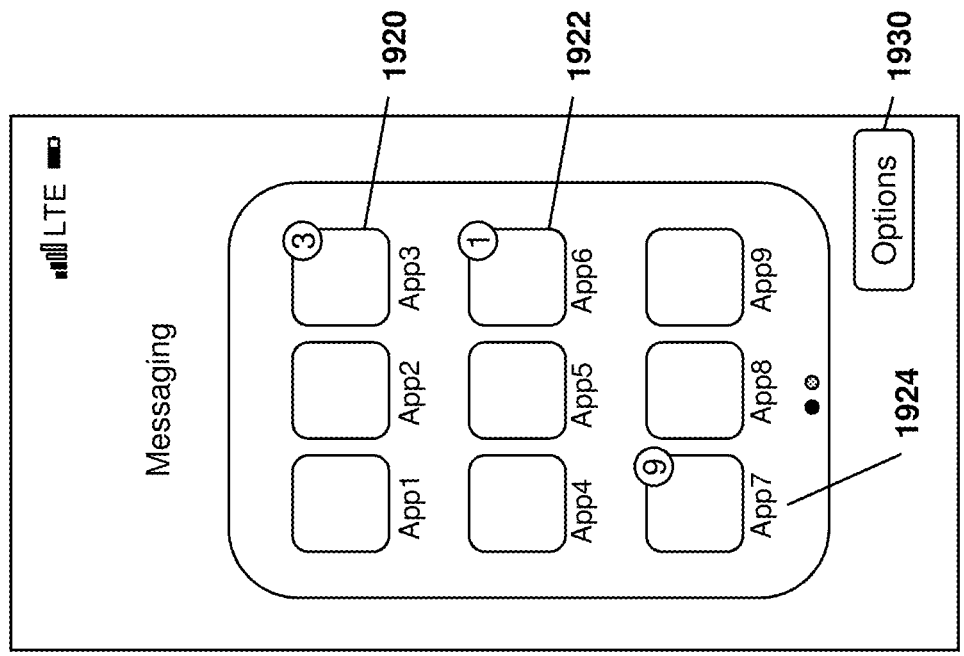
FIG. 19 is a block diagram showing a folder in which the folder configuration may be used to mute notifications.

For example, reference is now made to FIG. 19. As seen in FIG. 19, a messaging folder contains three applications with badges. This is shown with application icons 1920, 1922 and 1924.

Figure 20:
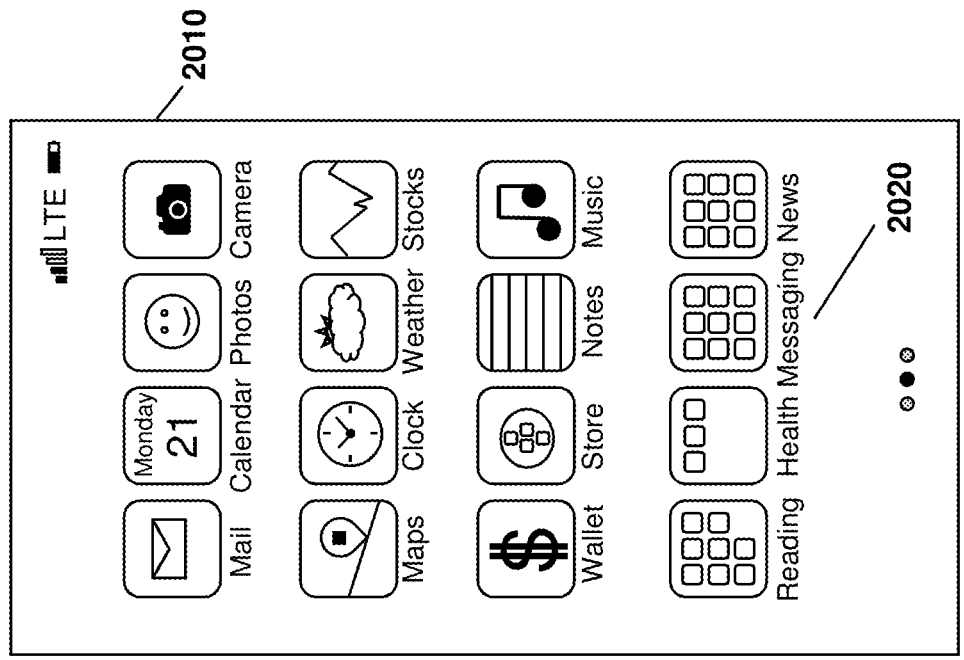
FIG. 20 is a block diagram showing a user interface in which folder badges are muted.

However, if a user has selected a configuration option for either the particular folder or for folders in general which indicates that badges should not be shown on that folder or those folders, then the user interface 2010 of FIG. 20 may be shown to a user, which has the messaging application icon 2020 without any badge.

In one embodiment, the configuration options may be presented to user after the user "long presses" the folder icon. For example, the long press may be accomplished by pressing and holding the folder icon for a threshold time period.

In other cases, the configuration menu may be obtained, for example, through a settings menu. In this case, the settings menu may provide an option for all folders, or may allow a user to navigate through the various folders to the desired folder in order to configure whether or not to show badges on that folder.

In other cases, when the folder is open, for example as shown in FIG. 19, a configuration button 1930 may be provided.

Other ways for obtaining a configuration menu are possible.

Figure 21:
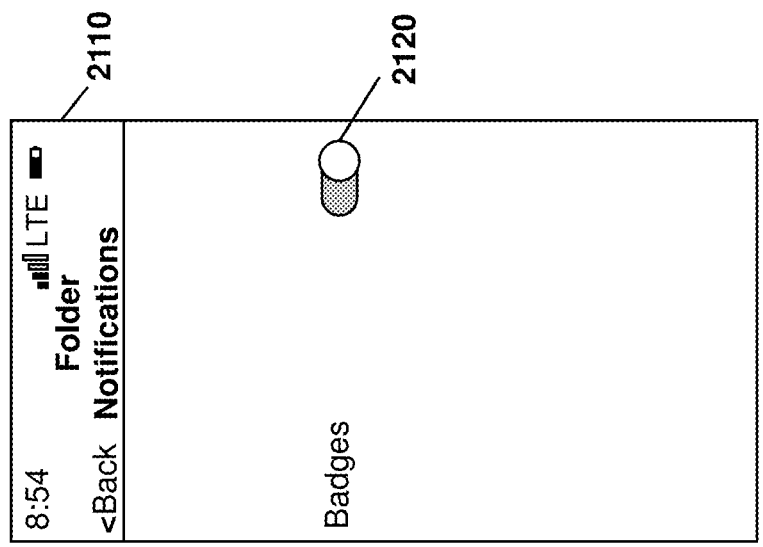
FIG. 21 is a block diagram showing user interface of the configuration menu for muting badges.

One simplified configuration menu is shown with regard to FIG. 21. As seen in FIG. 21, a configuration menu 2110 includes a badges toggle 2120, which may allow a user to turn off or on badging for the particular folder.

In other cases, a configuration for all folders may be provided in which badging for all folders may be turned on or off.

Figure 22:
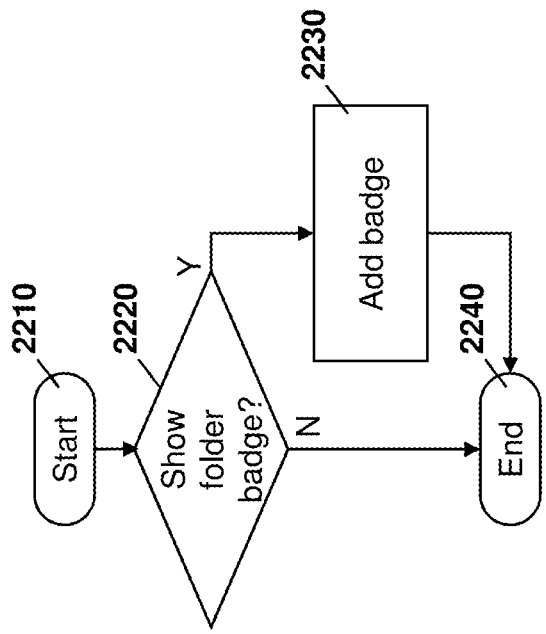
FIG. 22 is a process diagram showing a process for determining whether to show folder badges.

Reference is therefore made to FIG. 22, which shows a process for determining whether to show folder badges. The embodiment of FIG. 22 starts at block 2210 and proceeds to block 2220 in which a check is made to determine whether to show a folder badge. As provided above, this may be based on a configuration setting for the folder itself or for all folders within the user interface.

If it is determined at block 2220 that the folder badge should be shown, the process proceeds to block 2230 in which the badge is added to the folder if any of the applications within the folder have notifications.

Conversely, if the option is set to not show the folder badge, or after the badges been added at block 2230, the process proceeds to block 2240 and ends.

Clearing the Folder Badge without Clearing Application Badges

In a further embodiment, a user may be provided with a mechanism to clear a badge of the folder without clearing any badges on the applications within the folder.

For example, in one case, if a user long presses the folder, an option is presented to clear the badge at the folder level.

Alternatively, the user can press or long press the folder badge itself to bring up an option to clear the badge.

Other ways of obtaining a menu or option to clear badges is possible.

Figure 23:
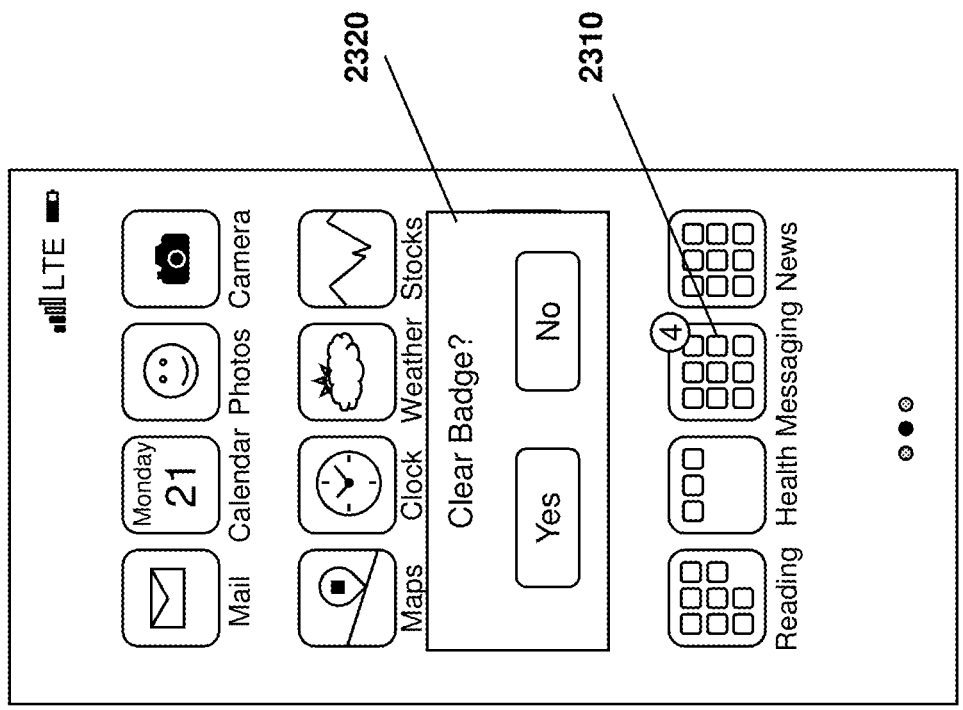
FIG. 23 is a block diagram showing user interface having a menu option to clear folder badges.

Reference is now made to FIG. 23. As seen in FIG. 23, a messaging folder has icon 2310. If the user long presses that the icon in some cases, or if the user long presses the badge associated with the icon in some cases, or in other ways indicates that the user wants to clear the badges, then a badge menu 2320 may be presented to the user. The badge menu in the example of FIG. 23 provides a confirmation to the user on whether to clear the badges of the folder. In this case, the clearing of the badges on the folder is independent of clearing the badges on the applications within the folder.

In the example of FIG. 23, menu 2320 includes a confirmation of whether the user wants to clear the badges on the folder or not.

Figure 24:
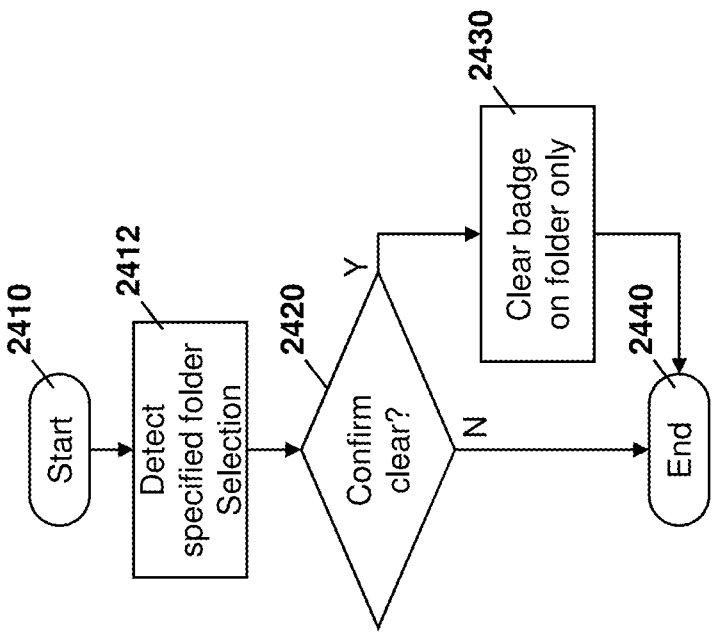
FIG. 24 is a process diagram showing the clearing of folder badges.

The process may be described with regard to FIG. 24. In this embodiment, the process starts at block 2410 and proceeds to block 2412 in which a detection on a specified folder for badge clearing is found. As indicated above, this may be through various mechanisms, including a pressing of the icon for the folder, or for the badge, in a defined way. For example a "long press" may provide the indication. In other cases, multiple presses within threshold time duration, or some form of swipe over the icon, among other options, could be provided to give an indication that the user wishes to clear the badging.

From block 2412, the process proceeds to block 2420 in which a check is made to determine whether the user has confirmed that the user wants to clear the badging. If yes, the process proceeds to block 2430 in which the badge is cleared for the folder only, leaving the badging for the applications within the folder intact. As will be appreciated by those in the art, in some cases a confirmation may not be required and therefore the check at block 2420 is optional.

The process then proceeds to block 2440 and ends.

Further, if the user does not confirm the clear at block 2420, the process may proceed directly to block 2440 and end.

Clearing the Folder Badge while Clearing Application Badges

In a further embodiment, a user may be provided with a mechanism to clear a badge of the folder while simultaneously clearing any badges on the applications within the folder.

For example, in one case, if a user long presses the folder, an option is presented to clear the badge at the folder and application level.

Alternatively, the user can press or long press the folder badge itself to bring up an option to clear the badges.

Other ways of obtaining a menu or option to clear badges is possible.

Figure 25:
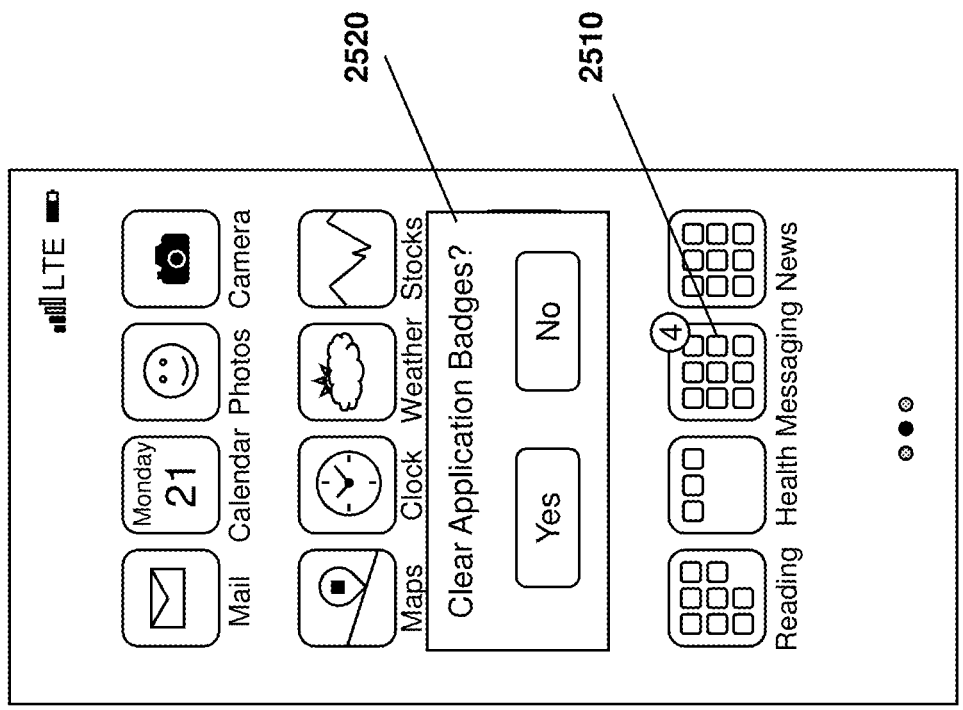
FIG. 25 is a block diagram showing user interface having a menu option to clear application badges.

Reference is now made to FIG. 25. As seen in FIG. 25, a messaging folder has icon 2510. If the user long presses that the icon in some cases, or if the user long presses the badge associated with the icon in some cases, or in other ways indicates that the user wants to clear the badges, then a badge menu 2520 may be presented to the user. The badge menu in the example of FIG. 25 provides a confirmation to the user on whether to clear the badges of the folder and applications within the folder. By clearing the badges of the applications within the folder, the folder itself will have no badge.

In the example of FIG. 25, menu 2520 includes a confirmation of whether the user wants to clear the badges or not.

Figure 26:
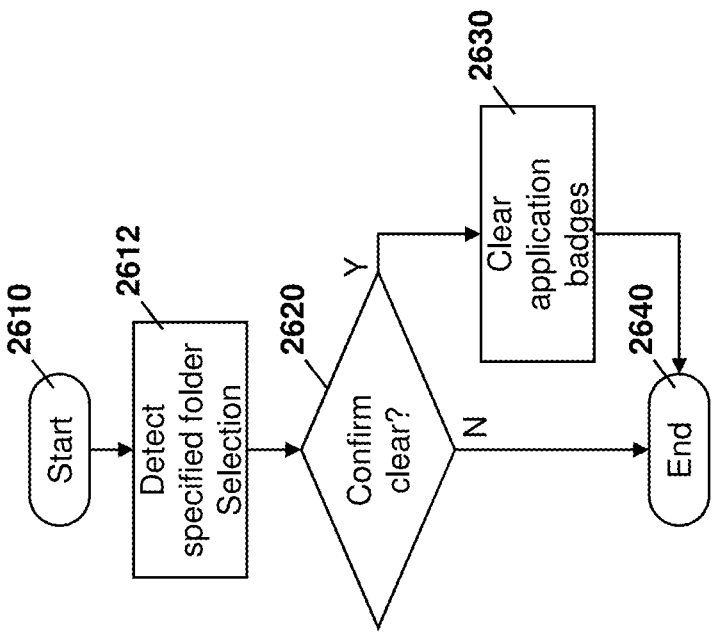
FIG. 26 is a process diagram showing the clearing of application badges.

The process may be described with regard to FIG. 26. In this embodiment, the process starts at block 2610 and proceeds to block 2612 in which a detection on a specified folder for badge clearing is found. As indicated above, this may be through various mechanisms, including a pressing of the icon for the folder, or for the badge, in a defined way. For example a "long press" may provide the indication. In other cases, multiple presses within threshold time duration, or some form of swipe over the icon, among other options, could be provided to give an indication that the user wishes to clear the badging.

From block 2612, the process proceeds to block 2620 in which a check is made to determine whether the user has confirmed that the user wants to clear the badging. If yes, the process proceeds to block 2630 in which the badges are cleared for the folder and applications. As will be appreciated by those in the art, in some cases a confirmation may not be required and therefore the check at block 2620 is optional.

The process then proceeds to block 2640 and ends.

Further, if the user does not confirm the clear at block 2620, the process may proceed directly to block 2640 and end.

Clearing the Folder Badge with or without Clearing Application Badges

In a further embodiment, a user may be provided with a mechanism to clear a badge of the folder and/or clear any badges on the applications within the folder. In this case, the user may be provided with an option of what the user wants to clear.

For example, in one case, if a user long presses the folder, an option is presented to clear the badges at the folder level or at the application level.

Alternatively, the user can press or long press the folder badge itself to bring up an option to clear the badges.

Other ways of obtaining a menu or option to clear badges is possible.

Figures 27, 28:
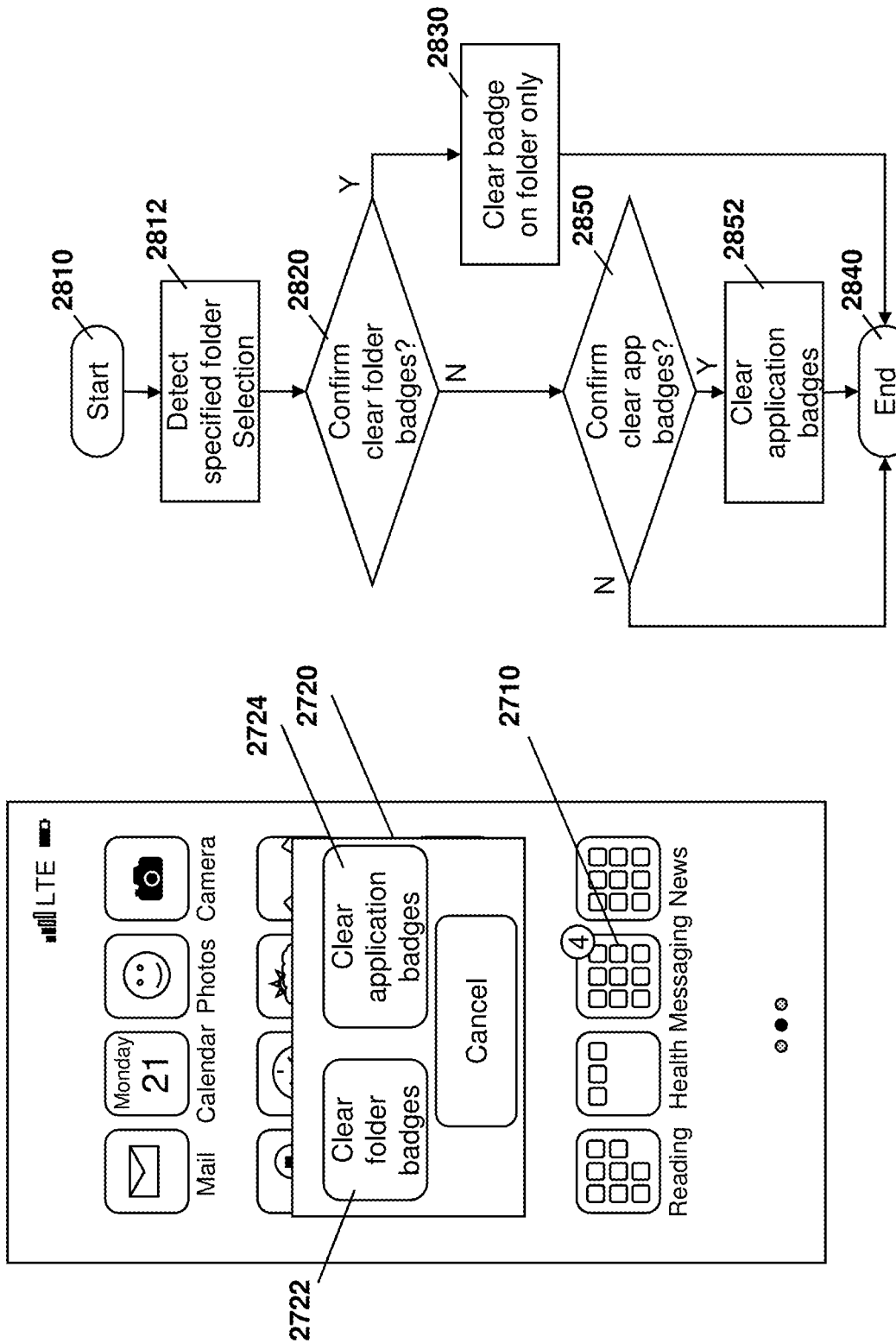
FIG. 27 is a block diagram showing user interface having a menu option to clear either folder or application badges.
FIG. 28 is a process diagram showing the clearing of folder or application badges.

Reference is now made to FIG. 27. As seen in FIG. 27, a messaging folder has icon 2710. If the user long presses that the icon in some cases, or if the user long presses the badge associated with the icon in some cases, or in other ways indicates that the user wants to clear the badges, then a badge menu 2720 may be presented to the user.

The badge menu of FIG. 27 may present various options to the user. For example, the user may be presented with a button to clear folder badges, shown as button 2722.

The user may be further provided with an option to clear application badges, shown as button 2724. As will be appreciated by those in the art, clearing of the application badges will also clear the folder badge.

The option menu may further allow for the cancelling of the clearing of badges in some cases.

The pressing of either button 2722 or button 2724 may, in some cases, provide a further menu for a confirmation to the user on whether to clear the badges.

The process may be described with regard to FIG. 28. In this embodiment, the process starts at block 2810 and proceeds to block 2812 in which a detection on a specified folder for badge clearing is found. As indicated above, this may be through various mechanisms, including a pressing of the icon for the folder, or for the badge, in a defined way. For example a "long press" may provide the indication. In other cases, multiple presses within threshold time duration, or some form of swipe over the icon, among other options, could be provided to give an indication that the user wishes to clear the badging.

From block 2812, the process proceeds to block 2820 in which a check is made to determine whether the user has confirmed that the user wants to clear the folder badging only. If yes, the process proceeds to block 2830 in which the badge is cleared for the folder only, leaving the badging for the applications within the folder intact.

The process then proceeds to block 2840 and ends.

Conversely, if the user does not confirm the clearing of folder badges only at block 2820, the process may proceed to block 2850 in which a check is made to determine whether the user has confirmed that the user wants to clear both application and folder badges. If yes, then the process proceeds to block 2852 in which the application badges are cleared, thereby also clearing the folder badges.

The process then proceeds from block 2852 to block 2840 and ends.

Further, if the user does not confirm that the user wants to clear the application badges at block 2850, then the process proceeds from block 2850 directly to block 2840 and ends.

Clearing a Folder Badge after a Time Period Elapses

In still a further embodiment, the folder badge can be configured to automatically clear after a time elapses. For example, if a user does not interact with a folder for N hours, where N is configurable, then the folder badge may automatically clear.

For example, such clearing may be used for folders of applications that are of minor importance to the user. A user may not be interested in notifications from restaurant applications, which may be stored in application folder, and therefore may ignore notification badges for this folder. If, after certain time has elapsed, the user has not interacted with the folder, then the badge for the folder may be cleared.

Figure 29:
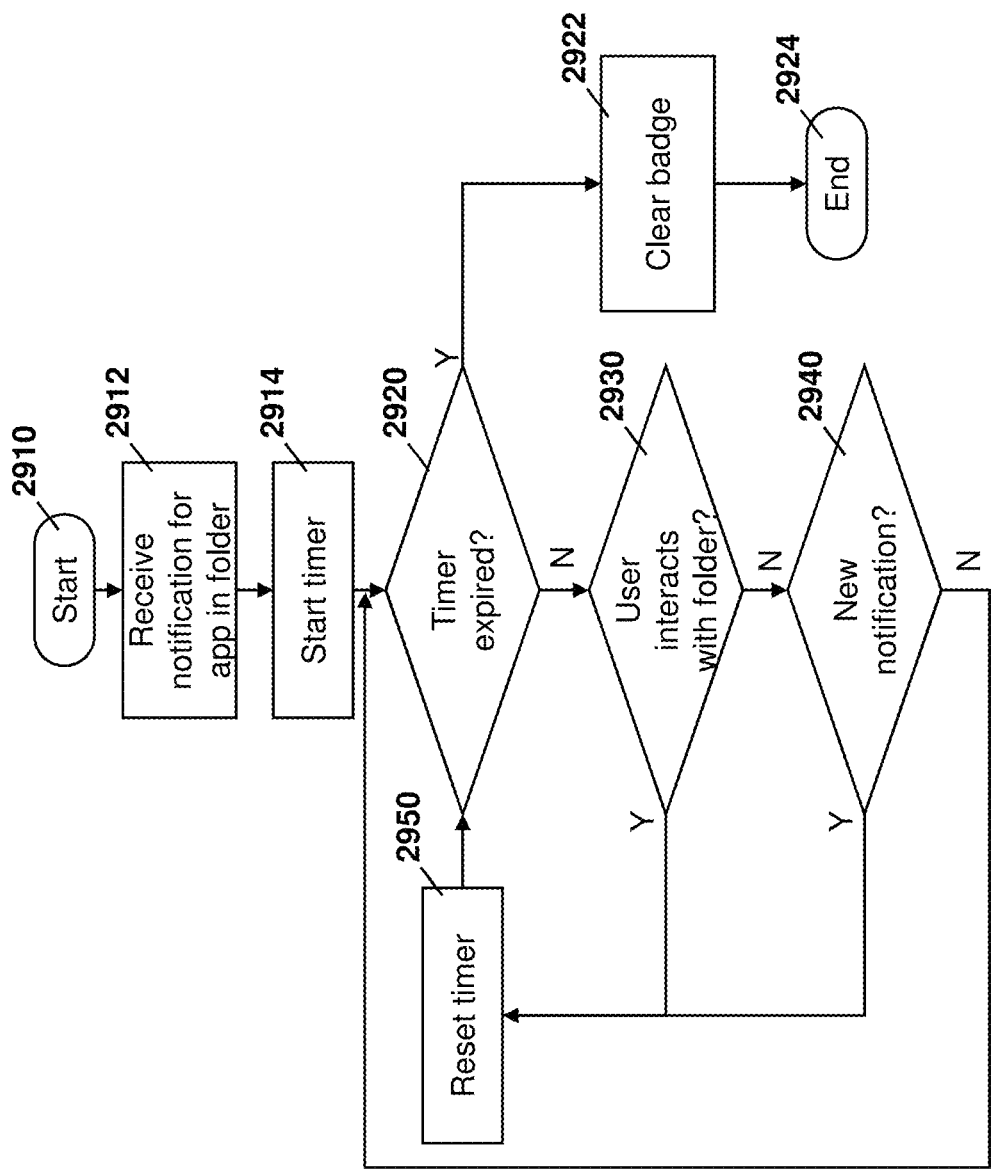
FIG. 29 is a process diagram showing aim process for clearing folder badges after a time period of inactivity has expired.

For example, one embodiment is shown with regard to FIG. 29. The process of FIG. 29 starts at block 2910 and proceeds to block 2912 in which the computing device may receive a notification for an application in a folder. In this case, the folder may be updated to include a badge showing the number of notifications.

The process then proceeds to block 2914 in which a timer may be started. In some cases, the value of the time or may be configurable by a user. In other cases, the timer value may be a default value stored at a computing device.

The process then proceeds to block 2920 in which a check is made to determine whether the timer has expired. If yes, this indicates that the user has ignored the folder badge notification and therefore the process proceeds to block 2922 and clears the badge. The process may then proceed to block 2924 and end.

In some cases, if the timer has not expired, as determined by block 2920, the process may continue to loop on block 2920 until the timer has expired.

However, in the embodiment of FIG. 29, the process proceeds from block 2920 to block 2930 in which check is made to determine whether the user has interacted with the folder. If not, the process may proceed to block 2940 in which a check is made to determine whether a new notification has been received for an application within the folder.

If the user has interacted with the folder or a new notification is received for an application within the folder, then the process may proceed to block 2950 in which the timer value is reset.

The process may then proceed from block 2950 back to block 2920 to continue to check whether the timer has expired.

In some cases, if the user has interacted with the folder, the badge may be cleared. In this case, the process would proceed from block 2930 directly to block 2922.

Other options for automatically clearing the badge after a determined time period are also possible. For example, the user can configure folder badging to only consider notifications or messages that have occurred within a certain period of time, e.g. 24 hours. For example, if an application is badged with a "1" at 12:30 PM on Monday and that badge impacts the folder badge, then the folder badge will consider the application badge until 12:30 PM on Tuesday, after which time the message or notification which caused the "1" to appear on the application badge will no longer be considered when calculating the folder badge.

Customizing the Notification Panel

In various operating systems, a mobile device such as a phone or tablet, may allow for notification of folders to be displayed when a user swipes down from the top of the screen. In other cases, notification panels may be displayed using some other mechanism.

Figure 30:
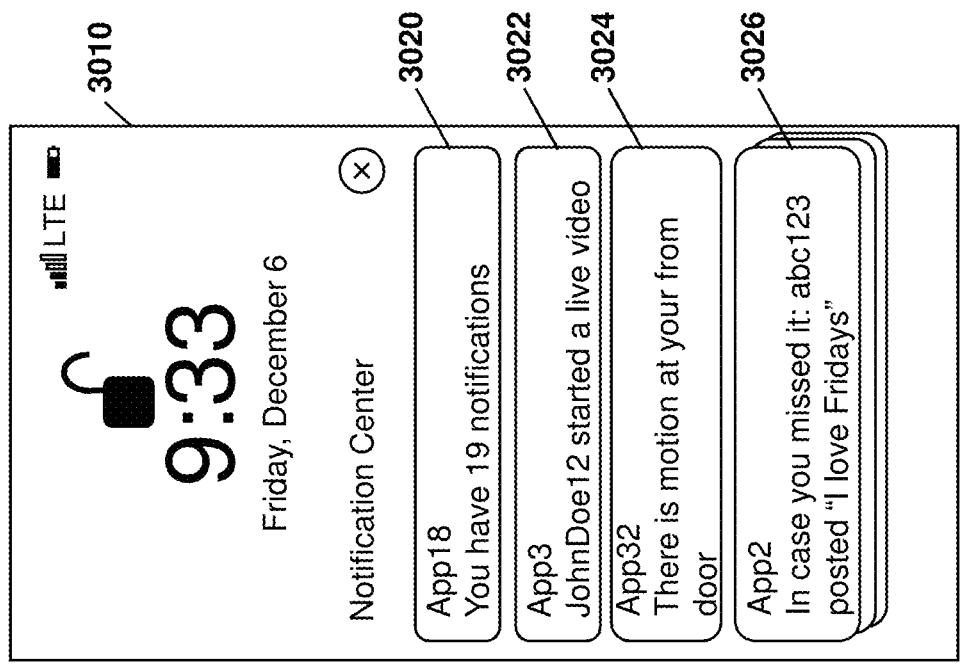
FIG. 30 is a block diagram showing a user interface having notification panels for notifications of applications on a computing device.

For example, reference is now made to FIG. 30, which shows a user interface 3010 in which the user has swiped down from the top of the screen. In this case, notification panels 3020, 3022, 3024 and 3026 are shown. These notification panels are from various applications. In the case of the application for which notification panel 3026 is shown, a plurality of notifications exist for the application, which are shown as stacked notifications.

In accordance with one embodiment of the present disclosure, the notification panels may be filtered if the user was previously in a folder view. Specifically, if the user was in a view such as that of FIG. 13, showing the messaging application folder with the application icons therein, and the user swiped from the top to show notification panels, then in accordance with one embodiment of the present disclosure the notification panels could be filtered to show only the notifications corresponding to applications within that folder.

Figure 31:
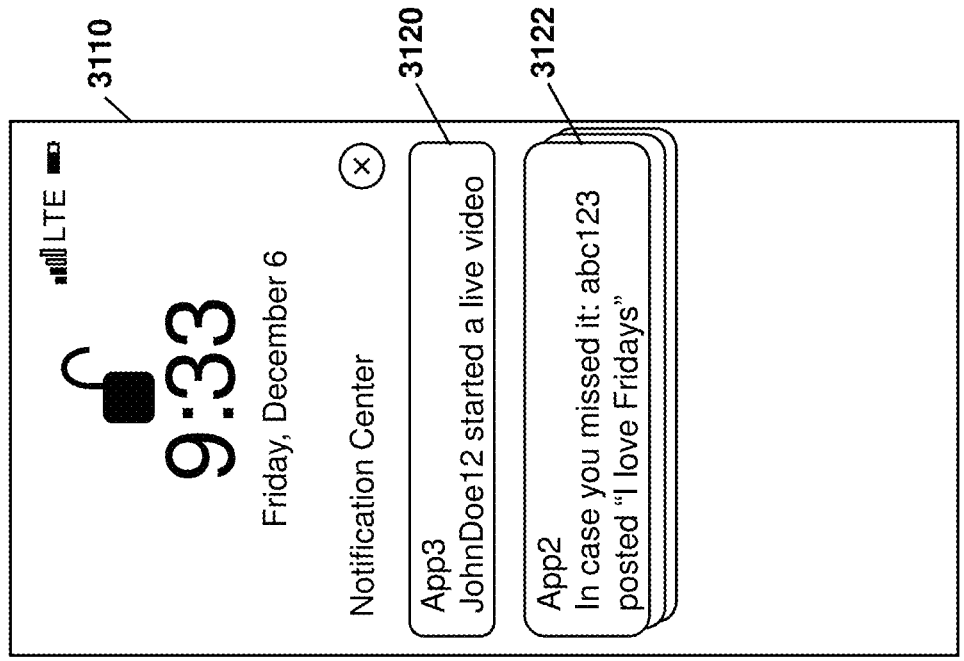
FIG. 31 is a block diagram showing a user interface having notification panels filtered based on a folder that was open when a user activated the notification panel view.

FIG. 31 shows a user interface 3110 in which the notification panels have been filtered to only include his notification panels 3120 and 3122. In each of the cases for these notification panels, the applications from which the notification panel is derived is found within the folder that was open when the user swiped down from the top of the screen.

Therefore, comparing the notification panels from FIG. 30 and those from FIG. 31, the notification panels 3020 and 3024 from FIG. 30 are excluded from the view of FIG. 31.

In some cases, a configuration menu may be provided to the user for a folder to indicate which notification panels will be displayed, whether all notification panels or notification panels only for applications within the folder.

Grouping of Notification Panels

Figure 32:
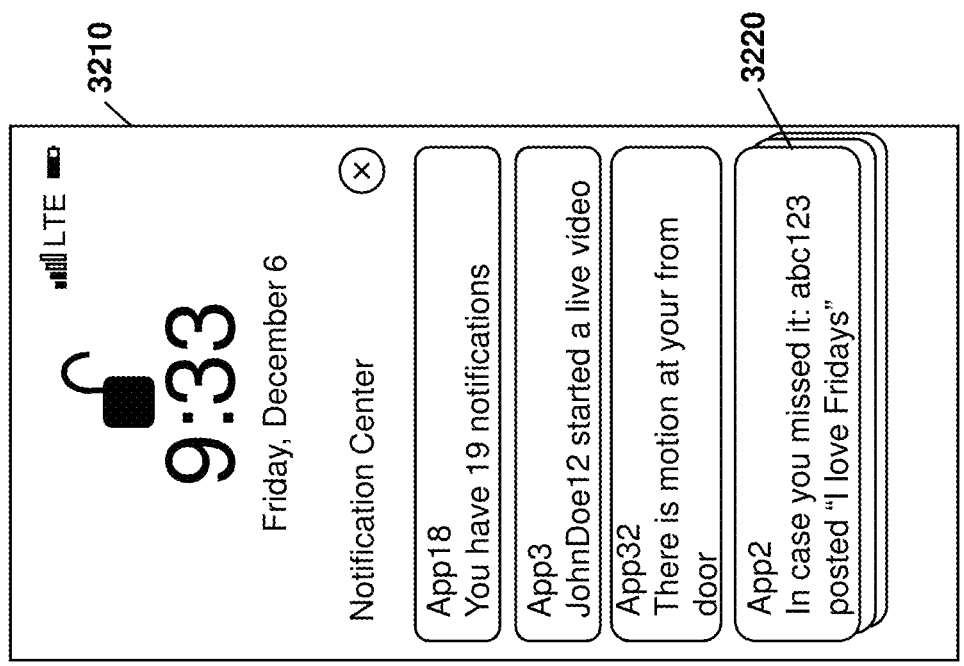
FIG. 32 is a block diagram showing user interface having notification panels in which application notification panels are grouped together in a stack.

In accordance with a further embodiment of the present disclosure, notification panels may be grouped. In particular, notification grouping is where notifications from a common application are grouped together. This is for example shown on user interface 3210 of FIG. 32. In this case, the notification panels 3220 are grouped together.

In some cases, if a user selects a group of notifications such as notification panels 3220, then the set of notifications for that application are displayed.

In accordance with one embodiment, rather than group notifications by application, notifications may be grouped by folder.

Figure 33:
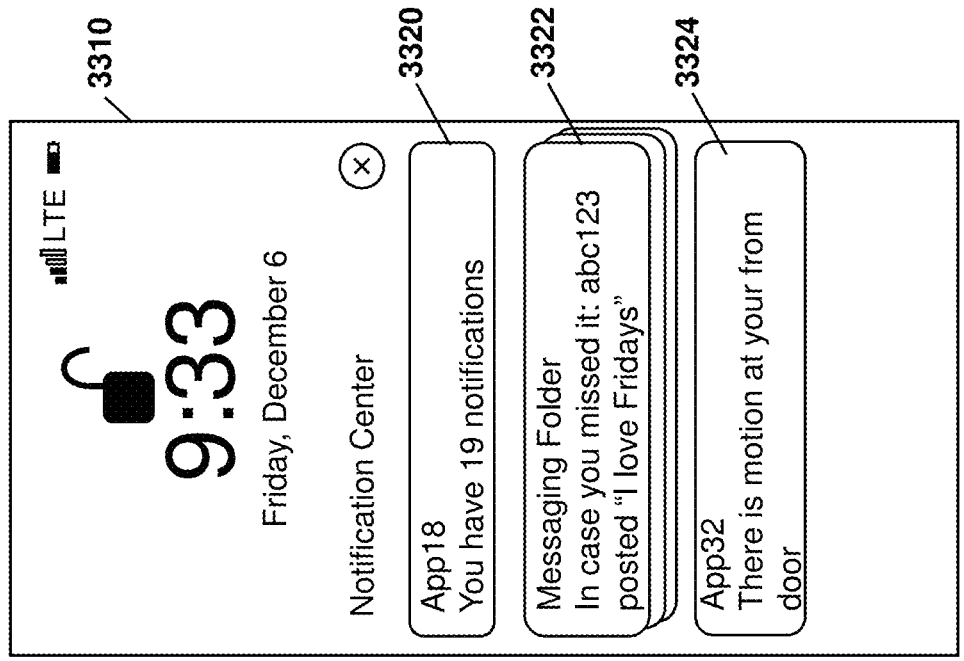
FIG. 33 is a block diagram showing user interface having notification panels in which folder notification panels are grouped together in a stack.

Therefore, reference is now made to FIG. 33. In the embodiment of FIG. 33, the user interface 3310 includes various notification panels, including notification panels 3320, 3322 and 3324.

Panels 3322 however are a grouping of notification panels and are for the messaging folder. Therefore, if a user selects the messaging notification panels 3322 then these notification panels would expand to provide an overview of the notifications for that folder.

Based on the embodiment of FIG. 33, an additional layer of a grouping is applied, so notifications for all applications in a particular folder are grouped together, which can then be "unstacked" by selecting a particular group of notifications. Upon selection of the notification for a particular folder, the device may display one "group of notifications" for each application in the folder. Upon selection of the "group of notifications" for a specific application, the device may display one entry per notification for the selected application. This behavior can be configurable via a configuration option, for example for the folder.

Therefore, if a user selected the group 3322, a screen such as that of FIG. 31 may be displayed is showing the notifications for the messaging folder. Further, if a user selected the notification panels 3122, then all notifications for that application may be expanded.

Defining Folder Notification Limits

In a further embodiment of the present disclosure, a user may define notification limits for all applications in a particular folder. At an application level, a user can define notification limits for a particular application such as one notification per hour. Therefore, this is expanded in the present disclosure to allow for folder level limits on a number of notifications.

Figure 34:
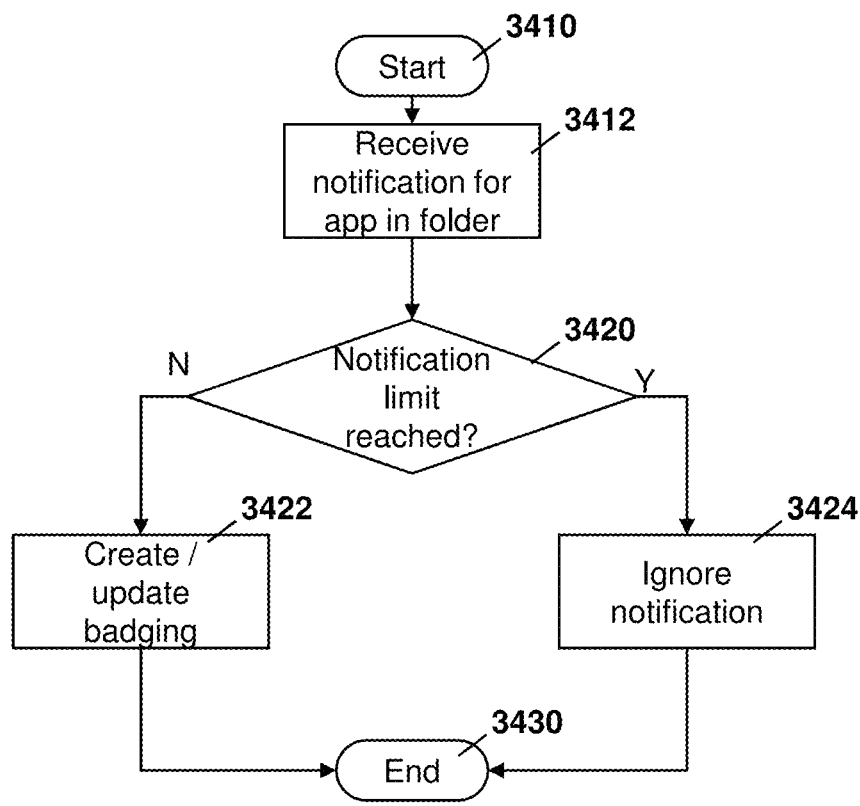
FIG. 34 is a process diagram showing the enforcement of a notification limit on a folder.

Reference is now made to FIG. 34, which shows a process for defining limits on notifications. The process starts at block 3410 and proceeds to block 3412 in which a notification is received for an application in a folder.

The process then proceeds to block 3420 in which a check is made to determine whether the notification will exceed notification limits within a given time period. For example, such given time period may be defined in a configuration option for the folder. The limit may, for example, be that only two notifications may be received per hour for applications from within that folder. However, the value of two notifications per hour is provided only for illustration purposes and the configuration could be any number of notifications for any length of time.

If the notification limit has not been reached, then the process may proceed to block 3422 in which the new notification is presented to the user.

Conversely, if the notification limit has been reached, then the process proceeds to block 3424 in which the notification is ignored. Even in the case notifications are not presented to the user, the application and folder badges can still be updated.

From blocks 3422 and 3424, the process proceeds to block 3430 and ends.

Muting Folder Notifications

In still a further embodiment of the present disclosure, a user may mute notifications for all applications in a particular folder. The muting may be for a specific time limit or may be until a user un-mutes the notifications.

Figure 35:
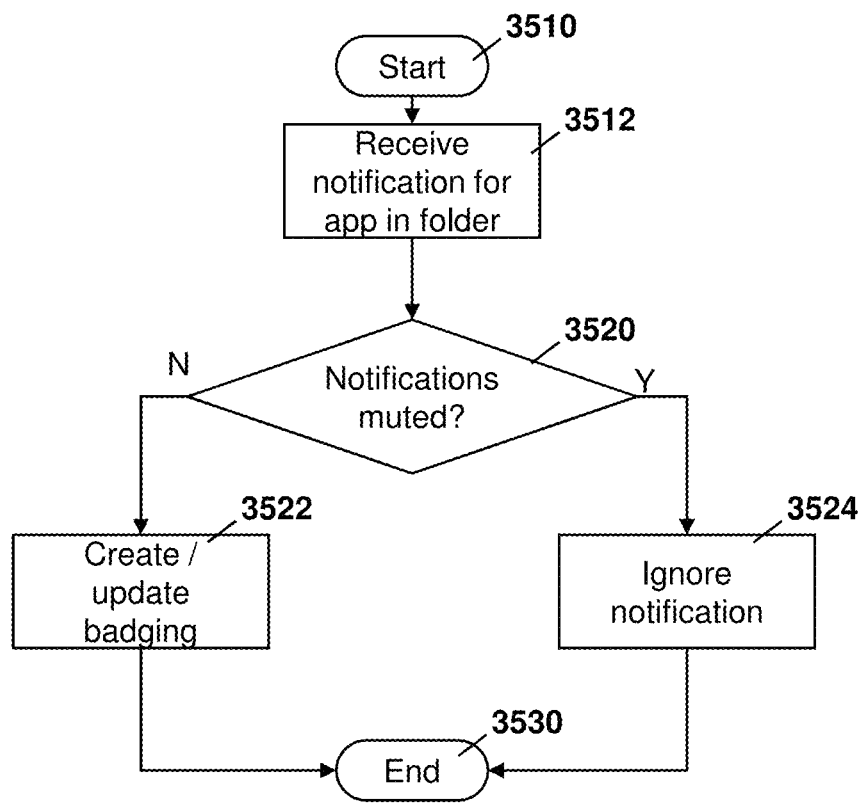
FIG. 35 is a process diagram showing the enforcement of muting of notifications for a folder.

Therefore, reference is now made to FIG. 35. The process of FIG. 35 starts at block 3510 and proceeds to block 3512 in which the computing device may receive a notification for an application in a folder.

The process then proceeds to block 3520 in which a check is made to determine whether notifications are muted for that folder. If not, the process proceeds to block 3522 in which a badge may be created or updated, or a notification panel may be created.

Conversely, if notifications are muted, then the process proceeds to block 3524 in which the notification is ignored such that audible alerts are muted and visual notifications (or a subset of visual notifications) are not shown. In some embodiments, when notifications are muted, the application and folder badges are updated, while other more intrusive visual alerts are not shown. In alternate embodiments, when notifications are muted, all visual notifications are now shown.

From block 3522 or block 3524, the process proceeds to block 3530 and ends.

The time period for muting notifications, or the creation of muting for notifications, may be done in a configuration menu that may be accessed through various techniques as described above.

Combining Notification Handling

Any of the embodiments above the may be combined to create a customizable notification for a user. For example, reference is now made to FIG. 36, which shows one example configuration menu for a folder. As seen in the user interface 3610, a badge folder toggle 3620 may allow the badging to be turned on or off for the folder.

Further, a time set 3622 may allow for the automatic clearing of badges on folders which have not been accessed during the time period.

A filter notification toggle 3624 may allow for the notification panels to be filtered based on the screen active when a user swipes from the top or otherwise shows notification panels.

The grouping of notifications toggle 3626 may allow for application notifications from within a folder to be grouped together.

A menu 3628 may allow for the setting of the maximum number notifications per hour.

The mute toggle 3630 may allow for muting of notifications from a particular folder.

Figure 36:
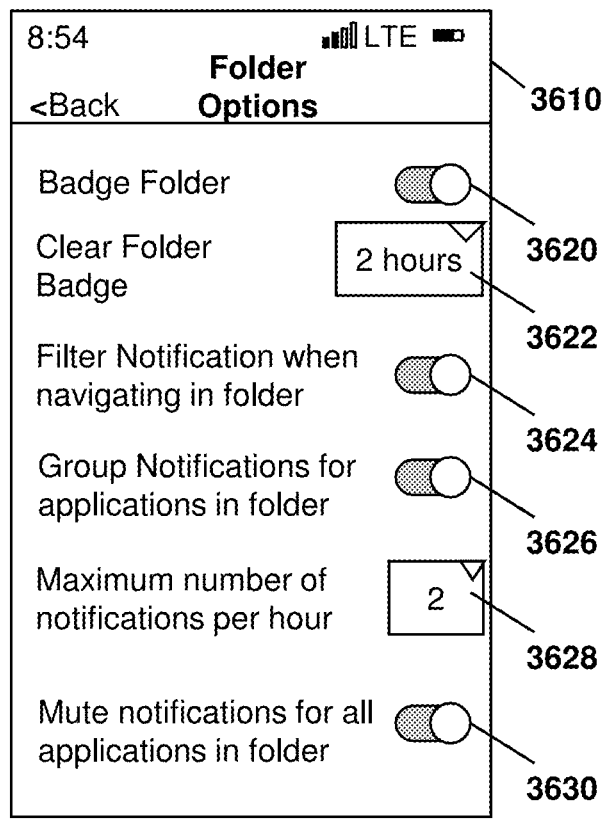
FIG. 36 is a block diagram showing a user interface with a configuration menu for configuring a plurality of the embodiments of the present disclosure.

The configuration menu of FIG. 36 is merely provided for illustration purposes. In other cases, a subset of the toggles or configuration options may be provided. In other cases, the other embodiments that are described above could be added to the configuration menu of FIG. 36. For example, in some cases the notification badge could be configured to show only the number of applications within a folder that have notifications rather than the total number of notifications, and this could be set in the configuration menu of FIG. 36.

Therefore, in accordance with the embodiments described above, various notification options for both badging and panels are provided to allow a user to customize the notification to suit the user, potentially reducing stress levels or anxiety based on notifications, and therefore creating a better user experience with the device.

The user interface and processes of FIGS. 1 to 36 above may be implemented on any computing or electronic device. One simplified diagram of an electronic device is shown with regard to FIG. 37.

Figure 37:
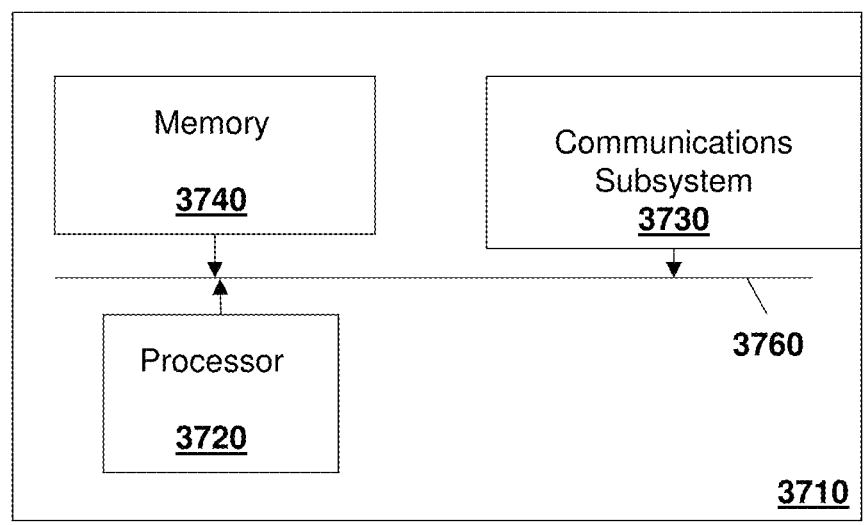
FIG. 37 is a block diagram of a simplified electronic device capable of being used with the methods and systems herein according to one embodiment.

In FIG. 37, device 3710 includes a processor 3720 and a communications subsystem 3730, where the processor 3720 and communications subsystem 3730 cooperate to perform the methods of the embodiments described above. Communications subsystem 3720 may, in some embodiments, comprise multiple subsystems, for example for different radio technologies.

Processor 3720 is configured to execute programmable logic, which may be stored, along with data, on device 3710, and shown in the example of FIG. 37 as memory 3740. Memory 3740 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 3740, device 3710 may access data or programmable logic from an external storage medium, for example through communications subsystem 3730.

Communications subsystem 3730 allows device 3710 to communicate with other devices or network elements and may vary based on the type of communication being performed. Further, communications subsystem 3730 may comprise a plurality of communications technologies, including any wired or wireless communications technology.

Communications between the various elements of device 3710 may be through an internal bus 3760 in one embodiment. However, other forms of communication are possible.

Further, if the electronic device is a user equipment, one example user equipment is described below with regard to FIG. 38.

User equipment 3800 may comprise a two-way wireless communication device having voice or data communication capabilities or both. User equipment 3800 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 3800 is enabled for two-way communication, it may incorporate a communication subsystem 3811, including a receiver 3812 and a transmitter 3814, as well as associated components such as one or more antenna elements 3816 and 3818, local oscillators (LOs) 3813, and a processing module such as a digital signal processor (DSP) 3820. As will be apparent to those skilled in the field of communications, the particular design of the communication subsystem 3811 will be dependent upon the communication network in which the user equipment is intended to operate.

Network access requirements will also vary depending upon the type of network 3819. In some networks, network access is associated with a subscriber or user of the user equipment 3800. A user equipment may require an embedded or a removable user identity module (RUIM) or a subscriber identity module (SIM) card or a UMTS SIM (USIM) in order to operate on a network. The USIM/SIM/RUIM interface 3844 is normally similar to a card-slot into which a USIM/SIM/RUIM card can be inserted and ejected. The USIM/SIM/RUIM card can have memory and hold many key configurations 3851, and other information 3853 such as identification, and subscriber related information.

When required network registration or activation procedures have been completed, user equipment 3800 may send and receive communication signals over the network 3819. As illustrated in FIG. 38, network 3819 can include multiple base stations communicating with the mobile device.

Signals received by antenna 3816 through communication network 3819 are input to receiver 3812, which may perform such common receiver functions as signal amplification, frequency down conversion, filtering, channel selection and the like. Analog to digital (A/D) conversion of a received signal allows more complex communication functions such as demodulation and decoding to be performed in the DSP 3820. In a similar manner, signals to be transmitted are processed, including modulation and encoding for example, by DSP 3820 and input to transmitter 3814 for digital to analog (D/A) conversion, frequency up conversion, filtering, amplification and transmission over the communication network 3819 via antenna 3818. DSP 3820 not only processes communication signals, but also provides for receiver and transmitter control. For example, the gains applied to communication signals in receiver 3812 and transmitter 3814 may be adaptively controlled through automatic gain control algorithms implemented in DSP 3820.

User equipment 3800 generally includes a processor 3838 which controls the overall operation of the device. Communication functions, including data and voice communications, are performed through communication subsystem 3811. Processor 3838 also interacts with further device subsystems such as the display 3822, flash memory 3824, random access memory (RAM) 3826, auxiliary input/output (I/O) subsystems 3828, serial port 3830, one or more keyboards or keypads 3832, speaker 3834, microphone 3836, other communication subsystem 3840 such as a short-range communications subsystem or DSRC subsystem, and any other device subsystems generally designated as 3842. Serial port 3830 could include a USB port, On-Board Diagnostics (OBD) port or other port known to those in the art.

Figure 38:
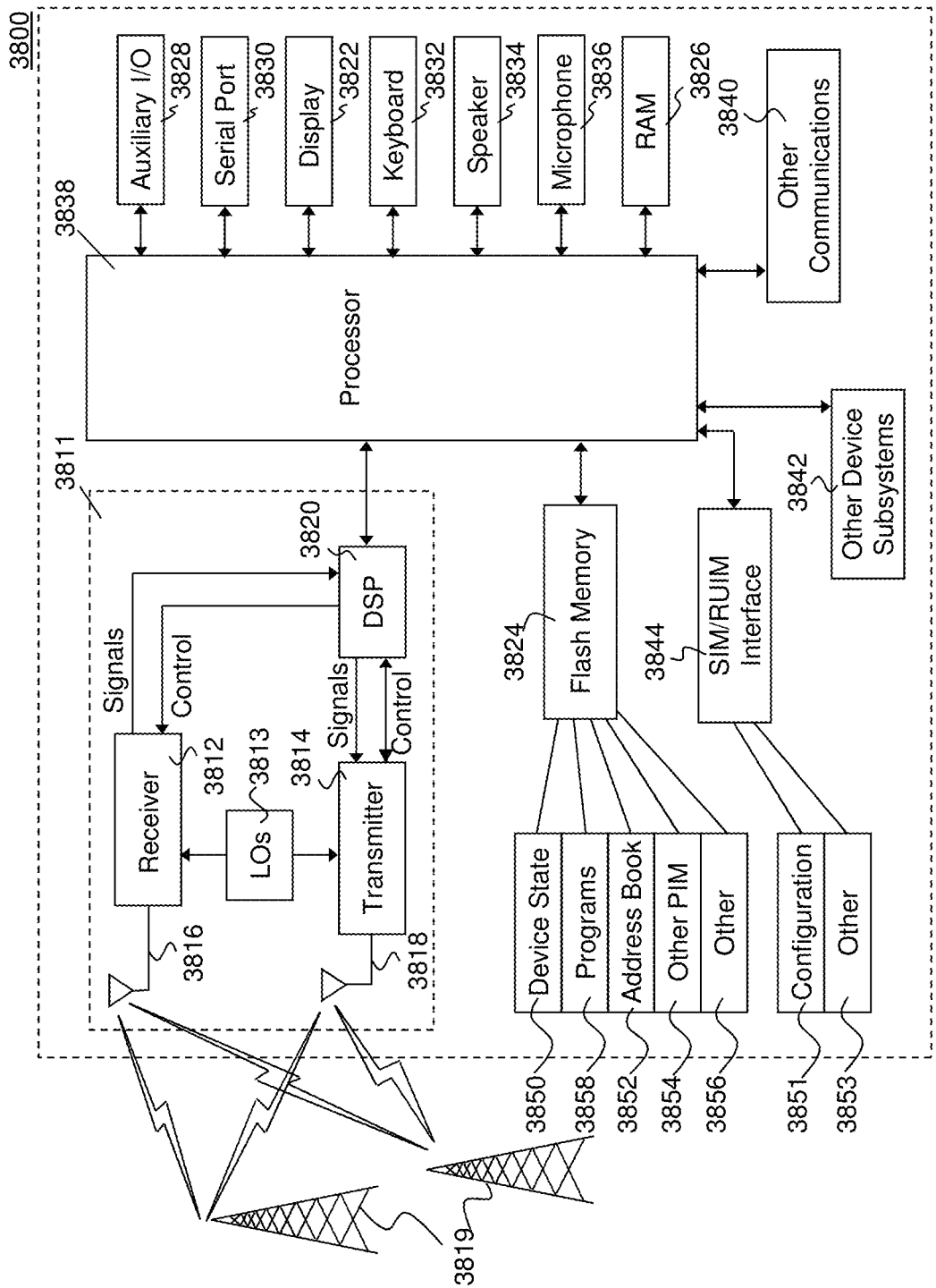
FIG. 38 is a block diagram of a mobile device according to one embodiment.

Some of the subsystems shown in FIG. 38 perform communication-related functions, whereas other subsystems may provide "resident" or on-device functions. Notably, some subsystems, such as keyboard 3832 and display 3822, for example, may be used for both communication-related functions, such as entering a text message for transmission over a communication network, and device-resident functions such as a calculator or task list.

Operating system software used by the processor 3838 may be stored in a persistent store such as flash memory 3824, which may instead be a read-only memory (ROM) or similar storage element (not shown). Those skilled in the art will appreciate that the operating system, specific device applications, or parts thereof, may be temporarily loaded into a volatile memory such as RAM 3826. Received communication signals may also be stored in RAM 3826.

As shown, flash memory 3824 can be segregated into different areas for both computer programs 3858 and program data storage 3850, 3852, 3854 and 3856. These different storage types indicate that each program can allocate a portion of flash memory 3824 for their own data storage requirements. Processor 3838, in addition to its operating system functions, may enable execution of software applications on the user equipment. A predetermined set of applications that control basic operations, including potentially data and voice communication applications for example, will normally be installed on user equipment 3800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, photo albums, voice mails, appointments, and task items. Further applications, including productivity applications, messaging applications, social media applications, games, among others, may also be loaded onto the user equipment 3800 through the network 3819, an auxiliary I/O subsystem 3828, serial port 3830, short-range communications subsystem 3840 or any other suitable subsystem 3842, and installed by a user in the RAM 3826 or a non-volatile store (not shown) for execution by the processor 3838. Such flexibility in application installation increases the functionality of the device and may provide enhanced on-device functions, communication-related functions, or both.

In a data communication mode, a received signal such as a text message or web page download will be processed by the communication subsystem 3811 and input to the processor 3838, which may further process the received signal for output to the display 3822, or alternatively to an auxiliary I/O device 3828.

A user of user equipment 3800 may also compose data items such as messages for example, using the keyboard 3832, which may be a complete alphanumeric keyboard or telephone-type keypad, either physical or virtual, among others, in conjunction with the display 3822 and possibly an auxiliary I/O device 3828. Such composed items may then be transmitted over a communication network through the communication subsystem 3811.

Where voice communications are provided, overall operation of user equipment 3800 is similar, except that received signals may typically be output to a speaker 3834 and signals for transmission may be generated by a microphone 3836. Alternative voice or audio I/O subsystems, such as a voice message recording subsystem, may also be implemented on user equipment 3800. Although voice or audio signal output is preferably accomplished primarily through the speaker 3834, display 3822 may also be used to provide an indication of the identity of a calling party, the duration of a voice call, or other voice call related information for example.

Serial port 3830 in FIG. 38 may be implemented in a user equipment for which synchronization with a user's desktop computer (not shown) may be desirable, but is an optional device component. Such a port 3830 may enable a user to set preferences through an external device or software application and may extend the capabilities of user equipment 3800 by providing for information or software downloads to user equipment 3800 other than through a wireless communication network. As will be appreciated by those skilled in the art, serial port 3830 can further be used to connect the user equipment to a computer to act as a modem or for charging a battery on the user equipment.

Other communications subsystems 3840, such as a short-range communications subsystem, is a further component which may provide for communication between user equipment 3800 and different systems or devices, which need not necessarily be similar devices. For example, the subsystem 3840 may include an infrared device and associated circuits and components or a Bluetooth™ or Bluetooth™ Low Energy communication module to provide for communication with similarly enabled systems and devices. Subsystem 3840 may further include non-cellular communications such as Wi-Fi or WiMAX, or near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an electronic device having a display, the method comprising:
    displaying a user interface on the display, wherein the user interface includes at least one folder icon for a folder, the folder including at least two applications;
    appending, to a folder icon of the at least one folder icon, a badge having a number, wherein the number represents notifications corresponding to one or multiple applications in the folder;
    receiving an input at the user interface to open a folder associated with the folder icon;
    determining whether one or multiple applications within the folder have a notification associated therewith;
    in response to the input and determining that only one application within the folder has a notification associated therewith, launching the one application with the notification directly; and
    in response to the input and determining that multiple applications within the folder have a notification associated therewith, launching an interface for the folder.

2. The method of claim 1, wherein the displaying comprises:
    determining that a folder associated with the folder icon has multiple screens;
    displaying a first screen and a badge number associated with applications within the first screen for a first time period; and
    displaying a second screen and a second badge number associated with applications within the second screen for a second time period.

3. The method of claim 1, further comprising an option associated with the folder icon to clear one or both of folder badging and application badging for applications within the folder.

4. The method of claim 1, wherein the displaying clears the badge after a time period of inactivity of interaction with the folder.

5. The method of claim 1, further comprising displaying notification panels filtered for a folder when opening a notification panel display while a user interface for the folder is shown.

6. The method of claim 1, further comprising grouping notification panels for all applications within a folder on a notification panel display.

7. An electronic device, the electronic device comprising:
    a processor; and
    a display,
    wherein the electronic device is configured to:
    display a user interface on the display, wherein the user interface includes at least one folder icon for a folder, the folder including at least two applications;
    append, to a folder icon of the at least one folder icon, a badge having a number, wherein the number represents a number of applications in the folder having notifications;
    receive an input at the user interface to open a folder associated with the folder icon;
    determine whether one or multiple applications within the folder have a notification associated therewith; and
    in response to the input and a determination that only one application within the folder has a notification associated therewith, launch the one application with the notification directly; and
    in response to the input and a determination that multiple applications within the folder have a notification associated therewith, launch an interface for the folder.

8. The electronic device of claim 7, wherein the electronic device is configured:
    determine on the display that a folder associated with the folder icon has multiple screens;
    display a first screen and a badge number associated with applications within the first screen for a first time period; and
    display a second screen and a second badge number associated with applications within the second screen for a second time period.

9. The electronic device of claim 7, wherein the electronic device is further configured to include an option associated with the folder icon to clear one or both of folder badging and application badging for applications within the folder.

10. The electronic device of claim 7, wherein the electronic device is further configured to clear from the display the badge after a time period of inactivity of interaction with the folder.

11. The electronic device of claim 7, wherein the electronic device is further configured to display notification panels filtered for a folder when opening a notification panel display while a user interface for the folder is shown.

12. The electronic device of claim 7, wherein the electronic device is further configured to group notification panels for all applications within a folder on a notification panel display.

13. A non-transitory computer readable medium for storing instruction code, which, when executed by a processor of an electronic device having a display, cause the electronic device to:
    display a user interface on the display, wherein the user interface includes at least one folder icon for a folder, the folder including at least two applications;
    append, to a folder icon of the at least one folder icon, a badge having a number, wherein the number represents a number of applications in the folder having notifications;
    receive an input at the user interface to open a folder associated with the folder icon;
    determine whether one or multiple applications within the folder have a notification associated therewith; and
    in response to the input and a determination that only one application within the folder has a notification associated therewith, launch the one application with the notification directly; and
    in response to the input and a determination that multiple applications within the folder have a notification associated therewith, launch an interface for the folder.

14. The non-transitory computer readable medium of claim 13, wherein the instruction code further causes the processor:
    determine on the display that a folder associated with the folder icon has multiple screens;
    display a first screen and a badge number associated with applications within the first screen for a first time period; and
    display a second screen and a second badge number associated with applications within the second screen for a second time period.

15. The non-transitory computer readable medium of claim 13, further comprising instruction code to cause the processor to include an option associated with the folder icon to clear one or both of folder badging and application badging for applications within the folder.

16. The non-transitory computer readable medium of claim 13, wherein to display comprises to clear the badge after a time period of inactivity of interaction with the folder.

17. The non-transitory computer readable medium of claim 13, further comprising instruction code to cause the processor to display notification panels filtered for a folder when opening a notification panel display while a user interface for the folder is shown.

18. The non-transitory computer readable medium of claim 13, further comprising instruction code to cause the processor to group notification panels for all applications within a folder on a notification panel display.

* * * * *